US012736191B1

(12) United States Patent
Goren

(10) Patent No.: US 12,736,191 B1
(45) Date of Patent: Sep. 15, 2026

(54) WEARABLE ILLUMINATION DEVICE

(71) Applicant: Richard H. Goren, Fishers, IN (US)

(72) Inventor: Richard H. Goren, Fishers, IN (US)

( * ) Notice: Subject to any disclaimer, the term of this patent is extended or adjusted under 35 U.S.C. 154(b) by 0 days.

(21) Appl. No.: 19/454,981

(22) Filed: Jan. 21, 2026

Related U.S. Application Data

(60) Provisional application No. 63/898,757, filed on Oct. 14, 2025, provisional application No. 63/853,957, filed on Jul. 30, 2025.

(51) Int. Cl.

| | |
|---|---|
| ***F21L 4/02*** | (2006.01) |
| ***F21L 4/08*** | (2006.01) |
| ***F21V 23/04*** | (2006.01) |
| ***H05B 47/12*** | (2020.01) |
| ***H05B 47/155*** | (2020.01) |
| ***H05B 47/165*** | (2020.01) |
| *F21Y 113/13* | (2016.01) |
| *F21Y 115/10* | (2016.01) |

(52) U.S. Cl.
CPC .................................... *F21L 4/02* (2013.01); *F21L 4/08* (2013.01); *F21V 23/0407* (2013.01); *F21V 23/0471* (2013.01); *H05B 47/12* (2020.01); *H05B 47/155* (2020.01); *H05B 47/165* (2020.01); *F21Y 2113/13* (2016.08); *F21Y 2115/10* (2016.08)

(58) Field of Classification Search
CPC .................................... F21L 4/02; F21L 4/08; F21V 23/0407; F21V 23/0471; F21Y 2113/13; F21Y 2115/10; H05B 47/12; H05B 47/155; H05B 47/165
See application file for complete search history.

(56) References Cited

U.S. PATENT DOCUMENTS 3,944,803 A * 3/1976 Chao .................. F21V 33/0008 362/108
10,842,234 B2 11/2020 Allan
11,262,064 B1 * 3/2022 Boyd .................. F21V 33/0008
11,802,680 B2 10/2023 Kearns
(Continued)

OTHER PUBLICATIONS

Garmin, Web Page—Garmin D2 Mach 1 Pro Aviator Smartwatch with Vented Titanium Bracelet Retrieved from the Internet: https://www.garmin.com/en-US/p/1398869/pn/010-02804-80, 36 pages, Nov. 19, 2024.
(Continued)

*Primary Examiner* — Zheng Song
(74) *Attorney, Agent, or Firm* — Woodard, Emhardt, Henry, Reeves, and Wagner, LLP

(57) ABSTRACT

An illumination device is configured to attach to a user. The illumination device is generally configured to illuminate an area around the user in a variety of ways. The illumination device generally includes one or more lights, a band, a controller, and an energy storage system (ESS). The lights are typically arranged to direct light in a forward direction, such as toward the hand of the user when the device is worn on the wrist. In one example, the lights are arranged at multiple positions along the band. The controller allows the user to operate the lights through multiple modes with varying brightness, color, and/or patterns of illumination. In one example, the illumination device supports a flashlight mode with broadly dispersed light and a laser mode with narrowly focused light. In one example, the ESS is rechargeable, such as through an inductive charging coil.

18 Claims, 32 Drawing Sheets

(56) References Cited

U.S. PATENT DOCUMENTS

| | | | | |
|---|---|---|---|---|
| 12,093,088 | B2 * | 9/2024 | Hiemstra | G06F 1/163 |
| 2005/0124945 | A1 * | 6/2005 | Powers | A61M 35/003 604/310 |
| 2006/0198120 | A1 | 9/2006 | Guzman | |
| 2011/0182057 | A1 * | 7/2011 | Watson | F21V 21/0816 362/103 |
| 2011/0310592 | A1 | 12/2011 | Smith | |
| 2017/0303646 | A1 * | 10/2017 | Bricken | G06F 1/163 |
| 2017/0357214 | A1 * | 12/2017 | Choi | G04B 37/14 |
| 2019/0033787 | A1 * | 1/2019 | Swanagin | A61B 5/681 |
| 2019/0093835 | A1 * | 3/2019 | Schorr, III | F21V 23/001 |
| 2022/0034490 | A1 * | 2/2022 | Kearns | F21V 23/06 |
| 2022/0175123 | A1 * | 6/2022 | Hertel | A45F 5/00 |
| 2025/0369607 | A1 * | 12/2025 | Evans | F21V 33/0064 |

OTHER PUBLICATIONS

Garmin, Web Page—Garmin Enduro 3 The Ultraperformance GPS Smartwatch Retrieved from the Internet: https://www.garmin.com/en-US/p/851039, 30 pages, Nov. 19, 2024.

* cited by examiner

WEARABLE ILLUMINATION DEVICE

CROSS REFERENCE TO RELATED APPLICATIONS

This application claims the benefit of US Patent Application Number 63/898,757, filed Oct. 14, 2025, which is hereby incorporated by reference. This application claims the benefit of U.S. Patent Application No. 63/853,957, filed Jul. 30, 2025, which is hereby incorporated by reference.

BACKGROUND

Engaging in activities during low-light conditions presents unique challenges. Visibility and safety become compromised. Insufficient lighting makes seeing surroundings clearly difficult. Poor visibility leads to accidents or decreases efficiency in performing tasks. Illumination often requires using hands which can limit the ability to perform other necessary actions.

Thus, there is a need for improvement in this field.

SUMMARY

Dark and low-light conditions typically impede the ability of individuals to partake in various activities, such as going for a run, working with tools, and/or performing other types of tasks. Traditional illumination devices, such as handheld flashlights and/or headlamps, oftentimes are cumbersome to use, difficult to orient at the desired angle, unable to provide enough lighting, and/or interfere with performing the task in other ways. For instance, in some cases, traditional devices cannot provide adequate illumination and/or must be adjusted repeatedly as the individual moves. Particularly, many individuals struggle to maintain proper lighting while performing tasks that require manual dexterity and freedom of movement. Such inadequate lighting typically creates various safety risks for the individual and/or others. Additionally, identifying and locating individuals is typically challenging in crowded and/or low-light environments.

A unique wearable illumination device has been developed to illuminate the area around a user in a variety of ways and for a variety of purposes. The illumination device is configured to be worn by a user, such as on the wrist, ankle, neck, and/or on another part of the body. Being wearable allows the illumination device to not be obtrusive to the user when performing tasks. For instance, the illumination device provides light while allowing technicians, mechanics, and/or other individuals to use both hands to handle tools. As another example, the illumination device is seamlessly wearable by runners, bikers, hikers, and/or other individuals to improve visibility to others and to illuminate the surroundings during outdoor activities. As yet another example, the illumination device helps users to be visible and identifiable in large crowds. The illumination device is configured to direct light in typically useful areas, such as the direction that the user is moving and/or looking. In one version, the illumination device is configured to emit light from a front end of the device. When a user wears the illumination device on the wrist, light is directed toward the hand of the user. Directing light in this way generally illuminates the area around the hands of the user and/or in the direction the user points. The illumination device therefore automatically provides lighting in the areas needed by the user while freeing the hands of the user.

Further, the illumination device is configured to utilize different lighting modes to provide lighting based on user preference and/or for specific types of tasks. In one example, the illumination device is configured to operate in a flashlight mode. When operating in flashlight mode, the illumination device is configured to provide a wide beam of light that illuminates a broad area. As another example, the illumination device is configured to operate in a laser mode. When in laser mode, light is focused into one or more concentrated streams of light. The illumination device generally allows the user to adjust the intensity of the light. For instance, the illumination device provides pre-set light intensity settings of low, medium, and high. Further, the illumination device allows the user to adjust the color and/or pattern of illumination among other examples. In one example, the lighting and/or appearance of the illumination device is arranged with particular indicia, branding, and/or color schemes for use at conventions, concerts, amusement parks, and/or other events.

The illumination device generally includes a band, one or more lights, a controller, and an Energy Storage System (ESS). The band generally secures the illumination device to the user. The lights are configured to illuminate the area around the device. The controller is configured to operate the lights in a variety of ways, such as based on the selected lighting mode. The ESS provides power to the illumination device. The ESS further helps the illumination device to be portable and easily wearable.

In one version, the band includes multiple links, such as metal links. The links are configured to couple to the lights and/or neighboring links to form the band. The length of the band is typically adjustable by removing and/or adding links. In another version, the band is formed from a continuous strip of material. In one example, the band is made of silicone. In other examples, the band is made of but not limited to leather, fabric, nylon, rubber, and/or a combination of materials. In one example, the band is adjustable for size. In yet another version, the band includes a slap bracelet. The slap bracelet is configured to conform around the wrist of the user when slapped against the wrist. The slap bracelet typically includes a flat flexible metal strip covered in fabric and/or silicone. In an initial position, the slap bracelet is generally straight and rigid. When the user hits the slap bracelet against the wrist with sufficient force, the slap bracelet wraps around the wrist.

In one example, the lights are in the form of light emitting diodes (LEDs). The LEDs are typically configured to emit multiple colors of light. For instance, the lights include multiple types of LEDs that emit light at different wavelengths. In one example, the lights are arranged along the band. For instance, the lights are coupled together through the links. In another example, the lights are arranged in a centralized location on the illumination device, such as in a housing. The illumination device typically further includes a light control circuit. The light control circuit facilitates operation of the lights by the controller. For example, the light control circuit includes multiple switches and/or other components that allow the controller to connect and/or disconnect one or more of the lights from the ESS.

The illumination device further includes a power management circuit. The power management circuit is configured to regulate electrical power flowing from the ESS to other components and to control charging of the ESS. In one example, the illumination device includes an electrical port. For example, the electrical port is in the form of a USB, USB-C, and/or another type of port. The electrical port allows the illumination device to receive power through a wired connection to charge the ESS. In another example, the illumination device includes a wireless charging pad, such as an inductive charging coil. The power management circuit is configured to control and monitor charging of the ESS based on power received through the electrical port, inductive charging coil, and/or another device. Further, the power management circuit typically includes a voltage regulator. The voltage regulator is configured to convert and/or maintain a voltage of electrical power from the ESS at a suitable level for the controller, the lights, and/or other components.

In one example, the illumination device is configured to receive inputs through a button. The button is connected to the controller. As should be appreciated, the controller is configured to utilize the button in the form of a switch, push-button, and/or other type of tactile input. The controller is configured to operate the lights based on inputs from the button. In one example, the push button is configured to activate the light from an off state when the button is pressed. In another example, the controller is configured to change the settings for the lights when the push button is pressed multiple times repeatedly and/or held for a period of time. In yet another example, the controller includes multiple buttons that each provide an input to adjust different settings, such as light mode, brightness, and/or color.

In one version, the illumination device further includes a microphone. The microphone allows the illumination device to receive voice commands and/or other sound-based commands. The controller is configured to operate the lights based on inputs from the microphone, such as changing the light mode, intensity, and/or color based on sound. In one example, the controller is configured to synchronize the lights to the rhythm and/or pitch of music. At concerts and/or in other settings, the synchronization enhances the visual experience for attendees.

In one version, the controller further includes an accelerometer. The accelerometer is configured to provide inputs to the controller based on movement of the user, such as flicking the wrist and/or raising the arm as examples. The controller is therefore configured to adjust the light based on user movement. For example, the controller can turn on, change colors, and/or flash the lights when the user raises the hand with the illumination device. Further, raising hands to activate the light typically assists locating the user in a crowded environment. In another example, the controller is configured to adjust the lights based on impacts to the illumination device. For instance, the controller is configured to operate the lights in a particular way when the user hits the illumination device.

In another version, the illumination devices are configured to work in pairs and/or in other multiples, such as with one illumination device worn on each wrist. In one example, two illumination devices are configured to activate specific light modes when used together. For example, the controller is configured to activate a specific light mode, such as a concert mode, when two illumination devices are hit together. In one version, concert mode includes flashing lights and changing colors.

In one version, the illumination device further includes a global positioning system (GPS). The GPS generally allows the illumination device to monitor the location of the user. In one example, the illumination device is configured to track movement of the user using the GPS. For instance, the GPS allows runners to measure the distance and/or track the path traveled during a run. In another example, the illumination device is configured to control the lights based on the location of the user. In some cases, venues such as sports arenas and/or concert halls plan visual displays that utilize lighting from personal devices of users. In one example, the illumination device is configured to control the lights in cooperation with such visual displays when the GPS detects the user is at the venue. Using such location-based light control creates an immersive experience for audience members wearing the illumination device.

The illumination device supports a variety of physical arrangements of components. In one example, the illumination device includes one or more circuit boards, such as a first board in a housing and a second board that extends along the band. In one example, the second board is in the form of a flexible printed circuit board (PCB). The flexible PCB allows the second board to bend with the band. In one example, the lights are all mounted and/or connected to the flexible PCB. The lights each have a housing and/or extend from the band when attached to the flexible PCB. In another example, the controller, the ESS, the electrical port, and/or other components are attached to the flexible PCB. In an alternate example, the controller, the ESS, and/or the electrical port are attached to a rigid PCB in a rigid housing.

In some use cases, such as for concerts, sporting events, and other events with large crowds, the illumination device is designed to be an inexpensive and yet reliable device that is easy to use. The illumination device has a slim design in which the multiple lights are embedded into the band for not only comfort but also to reduce the risk of light damage and snagging on clothing. To aid in reliability, the multiple lights in the band are powered by a single electrical power source, such as a battery or other ESS. If the light sources had separate or individual batteries, some batteries would require charging before others due to different usage patterns, and as a result, some lights might not have the power to illuminate. Moreover, the individual batteries increase the overall cost of the device and make recharging more difficult. The central battery location allows larger batteries to be used such that less expensive, standard battery types can be incorporated into the illumination device.

From the central power source, electrical conduits or wires embedded in the band transfer electrical power to the lights. In one form, the band is made from an electrically insulative material, and the power conduits are in the form of electrically conductive traces or wires made of copper or even silver. This construction eliminates the need for extra insulative material, which in turn reduces cost and makes the band slimmer. The illumination device has a simple user interface that is readily understandable, which can be especially helpful when handed out at large events. In one form, a battery is centrally housed in a central housing with bands extending from opposite sides of the housing. A prominent on-off or power button extends from the housing. With the prominent power button, most individuals wearing the illumination device can easily understand how to turn on and off the device, which can be especially helpful at events with large crowds. The more complex functions, such as coordinated illumination patterns between devices at large events, can be controlled behind the scenes without wearer input. Having the power located on the central battery housing also reduces the complexity and cost of power control for the device.

Moreover, the central housing for the battery not only provides a housing for device circuitry, but the housing further provides a large area or real estate for advertisements or other messages. For example, a sponsor of a concert or sporting event can display their name or logo on this advertisement space on the housing. Sponsorship fees from the advertisement space on the illumination device can offset the cost of the illumination device so that a large number of illumination devices can be handed for free (or at a reduced cost) at various events, like concerts or sporting events. In some cases, the cost of the illumination devices can be further offset by advertisements or sponsorship messages produced by coordinating the illumination of the devices at the event. For example, the illumination of the devices can be coordinated to spell a brand name, display a message, generate a brand logo/color, and/or create other impressions in the stands at a sporting event or concert.

In one version, the illumination device is arranged as a standalone unit with a fixed construction. For example, the housing and the band are integrated to form the illumination device as a cohesive unit. This allows the illumination device to have a unitary construction with the housing and the band coupled together in a fixed manner. In one example, the band is positioned through the housing and extends on either side of the housing. The band and housing are typically coupled together in a nonremovable and/or fixed manner. In another example, the band fully contains all the components of the illumination device. In some examples, the illumination device further includes magnets that are integrated into the band to help adjust the band on the user.

In one example, the illumination device further includes a selection switch. The selection switch allows users to provide inputs to change operational modes of the light sources. The controller is configured to receive a variety of inputs through the selection switch and/or the button.

In other configurations, only the illumination bands are sold as aftermarket products to replace the original equipment manufacturer (OEM) bands sold with smart watches. In some cases, the lights in the bands operate independently of the smart watches, but in most cases, the bands are able to communicate with the smart watch or other device, like a smartphone, sensor, or medical device (e.g., a heart strap, glucose meter, etc.), to coordinate lighting of the bands with the smart watches. For example, the bands can blink red when high blood pressure or an irregular heartbeat is detected with the smart watch. As another example, the lights on the band can shine different colors and/or light patterns that identify the sender of a message or a caller for a phone call.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including an illumination device.

Aspect 3 generally concerns the system of any previous aspect in which the illumination device is configured to be worn.

Aspect 4 generally concerns the system of any previous aspect in which the illumination device is configured to be worn on an appendage.

Aspect 5 generally concerns the system of any previous aspect in which the appendage includes a limb.

Aspect 6 generally concerns the system of any previous aspect in which the appendage includes an arm.

Aspect 7 generally concerns the system of any previous aspect in which the appendage includes a wrist.

Aspect 8 generally concerns the system of any previous aspect in which the appendage includes a hand.

Aspect 9 generally concerns the system of any previous aspect in which the appendage extends along a longitudinal axis.

Aspect 10 generally concerns the system of any previous aspect in which the arm extends along a longitudinal axis.

Aspect 11 generally concerns the system of any previous aspect in which the illumination device is configured to be worn on the wrist.

Aspect 12 generally concerns the system of any previous aspect in which the illumination device includes a band.

Aspect 13 generally concerns the system of any previous aspect in which the band is configured to wrap around the wrist.

Aspect 14 generally concerns the system of any previous aspect in which the band includes multiple links.

Aspect 15 generally concerns the system of any previous aspect in which the links are linked together to form a loop.

Aspect 16 generally concerns the system of any previous aspect in which the links are made of metal.

Aspect 17 generally concerns the system of any previous aspect in which the band is a wristband.

Aspect 18 generally concerns the system of any previous aspect in which the band includes a strap.

Aspect 19 generally concerns the system of any previous aspect in which the strap is made of flash-spun high-density polyethylene (HDPE) fibers.

Aspect 20 generally concerns the system of any previous aspect in which the strap includes an adhesive.

Aspect 21 generally concerns the system of any previous aspect in which the adhesive includes an area with the adhesive.

Aspect 22 generally concerns the system of any previous aspect in which the adhesive includes an adhesive pad.

Aspect 23 generally concerns the system of any previous aspect in which the strap is configured to self-adhere to form a loop.

Aspect 24 generally concerns the system of any previous aspect in which the strap has one or more security cuts.

Aspect 25 generally concerns the system of any previous aspect in which the strap is configured to break at the security cuts during removal.

Aspect 26 generally concerns the system of any previous aspect in which the security cuts include die cuts.

Aspect 27 generally concerns the system of any previous aspect in which the illumination device is disposable.

Aspect 28 generally concerns the system of any previous aspect in which the illumination device is configured to act as a security device.

Aspect 29 generally concerns the system of any previous aspect in which the illumination device is configured to act as an identification device.

Aspect 30 generally concerns the system of any previous aspect in which the illumination device includes one or more light sources.

Aspect 31 generally concerns the system of any previous aspect in which the illumination device includes multiple light sources.

Aspect 32 generally concerns the system of any previous aspect in which the light sources include light emitting diodes (LEDs).

Aspect 33 generally concerns the system of any previous aspect in which the light sources include lasers.

Aspect 34 generally concerns the system of any previous aspect in which the light sources are configured to shine one or more light beams.

Aspect 35 generally concerns the system of any previous aspect in which the light sources are configured to shine multiple colors of light.

Aspect 36 generally concerns the system of any previous aspect in which the light sources are positioned to shine light from an edge of the band.

Aspect 37 generally concerns the system of any previous aspect in which the light sources are positioned to shine light from an edge of the strap.

Aspect 38 generally concerns the system of any previous aspect in which the band has a proximal edge and a distal edge located opposite to the proximal edge.

Aspect 39 generally concerns the system of any previous aspect in which the strap has a proximal edge and a distal edge located opposite to the proximal edge.

Aspect 40 generally concerns the system of any previous aspect in which the proximal edge faces the arm when the illumination device is worn on the wrist.

Aspect 41 generally concerns the system of any previous aspect in which the distal edges face the hand when the illumination device is worn on the wrist.

Aspect 42 generally concerns the system of any previous aspect in which the illumination device is configured to shine light parallel to the longitudinal axis of the appendage.

Aspect 43 generally concerns the system of any previous aspect in which the light sources are positioned to shine the light parallel to the longitudinal axis of the arm.

Aspect 44 generally concerns the system of any previous aspect in which the light sources are positioned to shine the light around the hand.

Aspect 45 generally concerns the system of any previous aspect in which the light sources are configured to shine the light towards the hand.

Aspect 46 generally concerns the system of any previous aspect in which the light sources are embedded in the links.

Aspect 47 generally concerns the system of any previous aspect in which the light sources are positioned along the distal edge.

Aspect 48 generally concerns the system of any previous aspect in which the light sources are configured to shine the light from the distal edge.

Aspect 49 generally concerns the system of any previous aspect in which the light sources are configured to shine the light away from a user.

Aspect 50 generally concerns the system of any previous aspect in which the light sources are configured to shine the light away from the arm.

Aspect 51 generally concerns the system of any previous aspect in which the illumination device includes a controller.

Aspect 52 generally concerns the system of any previous aspect in which the controller is configured to control the light sources.

Aspect 53 generally concerns the system of any previous aspect in which the controller is operatively coupled to the light sources.

Aspect 54 generally concerns the system of any previous aspect in which the illumination device includes an Energy Storage System (ESS).

Aspect 55 generally concerns the system of any previous aspect in which the ESS includes a battery.

Aspect 56 generally concerns the system of any previous aspect in which the ESS is configured to power the illumination device.

Aspect 57 generally concerns the system of any previous aspect in which the ESS is configured to power the light sources.

Aspect 58 generally concerns the system of any previous aspect in which the illumination device includes a power management module.

Aspect 59 generally concerns the system of any previous aspect in which the power management module includes a power management circuit.

Aspect 60 generally concerns the system of any previous aspect in which the power management module is configured to control power from the ESS.

Aspect 61 generally concerns the system of any previous aspect in which the illumination device includes a satellite navigation system.

Aspect 62 generally concerns the system of any previous aspect in which the satellite navigation system is operatively coupled to the controller.

Aspect 63 generally concerns the system of any previous aspect in which the satellite navigation system includes a Global Positioning System (GPS) device.

Aspect 64 generally concerns the system of any previous aspect in which the GPS device includes a GPS chip.

Aspect 65 generally concerns the system of any previous aspect in which the illumination device includes a microphone.

Aspect 66 generally concerns the system of any previous aspect in which the microphone is operatively coupled to the controller.

Aspect 67 generally concerns the system of any previous aspect in which the illumination device includes an Inertial Measurement Unit (IMU).

Aspect 68 generally concerns the system of any previous aspect in which the IMU includes an accelerometer.

Aspect 69 generally concerns the system of any previous aspect in which the IMU is operatively coupled to the controller.

Aspect 70 generally concerns the system of any previous aspect in which the illumination device includes a button.

Aspect 71 generally concerns the system of any previous aspect in which the button is operatively coupled to the controller.

Aspect 72 generally concerns the system of any previous aspect in which the illumination device configured to illuminate an area around a user.

Aspect 73 generally concerns the system of any previous aspect in which the controller is configured to operate the light sources in multiple modes.

Aspect 74 generally concerns the system of any previous aspect in which the ESS includes a rechargeable battery.

Aspect 75 generally concerns the system of any previous aspect in which the lights are aligned to illuminate in one direction towards the hand of a user.

Aspect 76 generally concerns the system of any previous aspect in which the LEDs are multicolor LEDs.

Aspect 77 generally concerns the system of any previous aspect in which the length of the band is adjustable by adding or removing links.

Aspect 78 generally concerns the system of any previous aspect in which the illumination device includes a charging port for charging the rechargeable battery.

Aspect 79 generally concerns the system of any previous aspect in which the illumination device includes a wireless charging device to charge the battery.

Aspect 80 generally concerns the system of any previous aspect in which the charging plate includes a wireless charging coil.

Aspect 81 generally concerns the system of any previous aspect in which the controller is configured to cause operational change in the light sources based on a reading from the IMU.

Aspect 82 generally concerns the system of any previous aspect in which the operational change includes flashing the light sources.

Aspect 83 generally concerns the system of any previous aspect in which the operational change includes changing color of the light sources.

Aspect 84 generally concerns the system of any previous aspect in which the operational change includes a panic mode.

Aspect 85 generally concerns the system of any previous aspect in which the reading includes rapid acceleration.

Aspect 86 generally concerns the system of any previous aspect in which the reading includes movement indicative of a flick of the wrist.

Aspect 87 generally concerns the system of any previous aspect in which the reading includes movement indicative of bands being hit together.

Aspect 88 generally concerns the system of any previous aspect in which the controller is configured to cause operational change in the light sources based on sound sensed by the microphone.

Aspect 89 generally concerns the system of any previous aspect in which the operational change includes flashing the light sources with the sound.

Aspect 90 generally concerns the system of any previous aspect in which the operational change includes changing color of the light sources with the sound.

Aspect 91 generally concerns the system of any previous aspect in which the controller is configured to cause operational change in the light sources based on location from the satellite navigation unit.

Aspect 92 generally concerns the system of any previous aspect in which the controller is configured to receive audio commands via the microphone.

Aspect 93 generally concerns the system of any previous aspect in which the light sources are configured to synchronize to music at an event.

Aspect 94 generally concerns the system of any previous aspect in which the controller is configured to coordinate operation of the light sources with a lighting display at an event when at the event.

Aspect 95 generally concerns the system of any previous aspect in which the illumination device has a laser mode where light from the light sources is directed in a tight beam.

Aspect 96 generally concerns the system of any previous aspect in which the illumination device has a flashlight mode where light from the light sources is dispersed in a broad area.

Aspect 97 generally concerns the system of any previous aspect in which the light sources are mounted on a flexible printed circuit board (PCB).

Aspect 98 generally concerns the system of any previous aspect in which the flexible PCB extends along the band.

Aspect 99 generally concerns the system of any previous aspect including a housing.

Aspect 100 generally concerns the system of any previous aspect including one or more light sources.

Aspect 101 generally concerns the system of any previous aspect including a band configured to wrap around the appendage.

Aspect 102 generally concerns the system of any previous aspect in which the light sources are positioned along the band.

Aspect 103 generally concerns the system of any previous aspect in which the light sources are contained within the band.

Aspect 104 generally concerns the system of any previous aspect including an energy Storage System (ESS).

Aspect 105 generally concerns the system of any previous aspect in which the housing contains the ESS.

Aspect 106 generally concerns the system of any previous aspect in which the ESS is electrically connected to the light sources.

Aspect 107 generally concerns the system of any previous aspect in which the controller includes a microcontroller.

Aspect 108 generally concerns the system of any previous aspect in which the microcontroller has a single core.

Aspect 109 generally concerns the system of any previous aspect in which the illumination device includes a speaker.

Aspect 110 generally concerns the system of any previous aspect in which the speaker is configured to provide audio feedback to the user.

Aspect 111 generally concerns the system of any previous aspect in which the speaker is configured to play sound effects.

Aspect 112 generally concerns the system of any previous aspect in which the band includes a slap bracelet.

Aspect 113 generally concerns the system of any previous aspect in which the band defines multiple slots.

Aspect 114 generally concerns the system of any previous aspect in which the light sources are positioned within the band.

Aspect 115 generally concerns the system of any previous aspect in which the light source is positioned in one of the slots.

Aspect 116 generally concerns the system of any previous aspect in which the slots open toward the distal end.

Aspect 117 generally concerns the system of any previous aspect in which the band includes a flexible silicone band.

Aspect 118 generally concerns the system of any previous aspect in which the band includes multiple band segments.

Aspect 119 generally concerns the system of any previous aspect in which the band segments are removably attachable to the housing.

Aspect 120 generally concerns the system of any previous aspect in which the illumination device includes a support plate.

Aspect 121 generally concerns the system of any previous aspect in which the support plate provides structural support for one or more of the circuit boards in the housing.

Aspect 122 generally concerns the system of any previous aspect in which the support plate is coupled to the band segments.

Aspect 123 generally concerns the system of any previous aspect in which the band is formed as a unitary part that includes the band segments and the support plate.

Aspect 124 generally concerns the system of any previous aspect in which the band includes one or more magnets.

Aspect 125 generally concerns the system of any previous aspect in which the band segments are configured to attach to each other via the magnets.

Aspect 126 generally concerns the system of any previous aspect in which the magnets are enclosed within the band.

Aspect 127 generally concerns the system of any previous aspect in which the band includes a support plate positioned between the band segments.

Aspect 128 generally concerns the system of any previous aspect in which the band is coupled to the housing through the support plate.

Aspect 129 generally concerns the system of any previous aspect in which the controller is operatively connected to the light sources.

Aspect 130 generally concerns the system of any previous aspect in which the controller is configured to receive the input through the button.

Aspect 131 generally concerns the system of any previous aspect in which the flexible PCB extends into the housing.

Aspect 132 generally concerns the system of any previous aspect in which the band and the housing are fixed together to form a unitary construction.

Aspect 133 generally concerns the system of any previous aspect in which the band is coupled to the housing in a nonremovable manner.

Aspect 134 generally concerns the system of any previous aspect in which the band extends through the housing.

Aspect 135 generally concerns the system of any previous aspect in which the band is a single continuous part.

Aspect 136 generally concerns the system of any previous aspect in which the illumination device is a self-contained unit.

Aspect 137 generally concerns the system of any previous aspect in which the illumination device is a cohesive unit with a fixed construction.

Aspect 138 generally concerns the system of any previous aspect in which the band is coupled to the housing in a fixed manner.

Aspect 139 generally concerns the system of any previous aspect in which the band and housing form the illumination device as a cohesive unit.

Aspect 140 generally concerns the system of any previous aspect in which the illumination device includes a housing.

Aspect 141 generally concerns the system of any previous aspect in which the controller is configured to cause operational change in the light sources based on an input from a user.

Aspect 142 generally concerns the system of any previous aspect in which the band defines multiple radial openings.

Aspect 143 generally concerns the system of any previous aspect in which the radial openings extend from a radial exterior of the band to the light sources within the band.

Aspect 144 generally concerns the system of any previous aspect in which the light sources are configured to illuminate the radial exterior by emitting light through the radial openings.

Aspect 145 generally concerns the system of any previous aspect in which the illumination device includes a selection switch.

Aspect 146 generally concerns the system of any previous aspect in which the controller is configured to cause operational change in the light sources based on an input from the selection switch.

Aspect 147 generally concerns a method.

Aspect 148 generally concerns the method of any previous aspect including attaching an illumination device to an appendage.

Aspect 149 generally concerns the method of any previous aspect including shining light from one or more light sources from the illumination device.

Aspect 150 generally concerns the method of any previous aspect including synchronizing the light sources with music at an event.

Aspect 151 generally concerns the method of any previous aspect including flashing the light sources with the music.

Aspect 152 generally concerns the method of any previous aspect including changing color of the light sources with the music.

Aspect 153 generally concerns the method of any previous aspect including coordinating operation of the light sources with a lighting display.

Aspect 154 generally concerns the method of any previous aspect including changing operation of the light sources when the illumination device is flicked.

Aspect 155 generally concerns the method of any previous aspect including changing operation of the light sources when the illumination device is hit.

Aspect 156 generally concerns the method of any previous aspect including shining light from one or more light sources from an edge of the illumination device.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
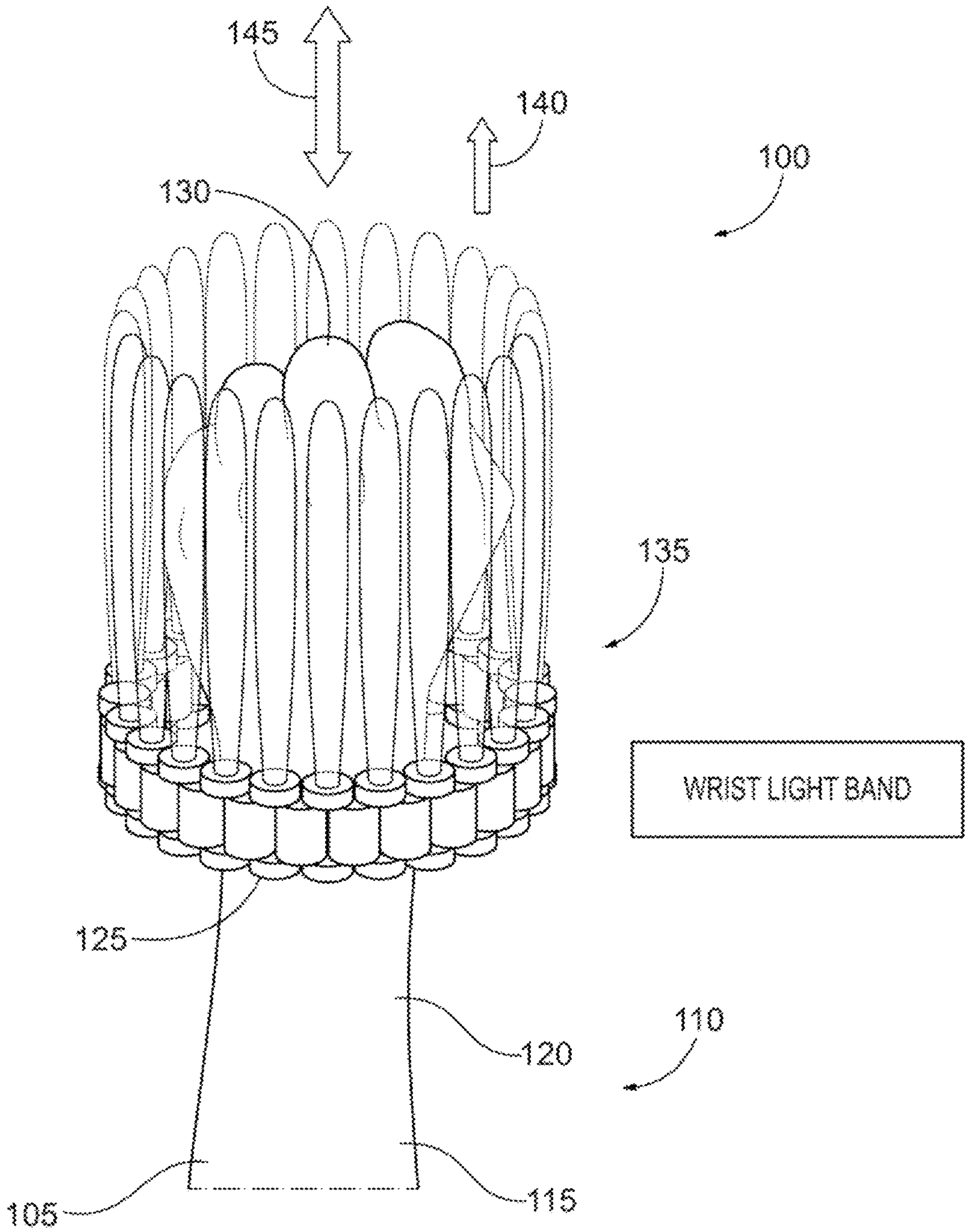
FIG. 1 is a perspective view of an illumination device according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Once more, dark and low-light conditions typically impede the ability of individuals to partake in various activities, such as going for a run, working with tools, and/or performing other types of tasks. Traditional lighting devices, such as handheld flashlights and/or headlamps, oftentimes are cumbersome to use, difficult to orient at the desired angle, unable to provide enough lighting, and/or interfere with performing the task in other ways. For instance, in some cases, traditional devices cannot provide adequate illumination and/or must be adjusted repeatedly as the individual moves. Particularly, many individuals struggle to maintain proper lighting while performing tasks that require manual dexterity and freedom of movement. Such inadequate lighting typically creates various safety risks for the individual and/or others. Additionally, identifying and locating individuals is typically challenging in crowded and/or low-light environments, like nighttime outdoor concerts.

Referring to FIG. 1, a unique wearable illumination device 100 has been developed to illuminate the area around a user 105 in a variety of ways and for a variety of purposes. The illumination device 100 is configured to be worn by a user 105 on an appendage 110 like a limb 115. In the depicted example, the limb 115 includes an arm 120 with a wrist 125 and a hand 130, and the illumination device 100 is worn over the wrist 125 between the forearm and the hand 130. It should be recognized that the illumination device 100 can be worn on other parts of the body, like the ankle and neck. Being wearable allows the illumination device 100 to not be obtrusive to the user 105 when performing tasks. For instance, the illumination device 100 provides light while allowing technicians, mechanics, and/or other individuals to use both hands 130 to handle tools. As another example, the illumination device 100 is seamlessly wearable by runners, bikers, hikers, and/or other individuals to improve visibility to others and to illuminate the surroundings during outdoor activities. As yet another example, the illumination device 100 helps users 105 to be visible and identifiable in large crowds. The illumination device 100 is configured to direct light in typically useful areas, such as the direction that the user 105 is moving and/or looking. In one version, the illumination device 100 is configured to emit light from a distal end 135 or side of the illumination device 100 in the direction indicated by an arrow 140 in FIG. 1. When a user 105 wears the illumination device 100 on the wrist 125, light is generally directed around the hand 130 of the user 105. The light from the illumination device 100 shines way from the hand 130 in the direction of the arrow 140 that is generally parallel to a longitudinal axis 145 of the forearm of the arm 120. Directing light in this way generally illuminates the area around the hands 130 of the user 105 and/or in the direction the user 105 points. The illumination device 100 therefore automatically provides lighting in the areas needed by the user 105 while freeing the hands 130 of the user 105.

Further, the illumination device 100 is configured to utilize different lighting modes to provide lighting based on the preference of the individual and/or for specific types of tasks. In one example, the illumination device 100 is configured to operate in a flashlight mode. When operating in the flashlight mode, the illumination device 100 is configured to provide a wide beam of light that illuminates a broad area. As another example, the illumination device 100 is configured to operate in a laser mode. When in laser mode, light is focused into one or more concentrated streams of light. The illumination device 100 generally allows the user 105 to adjust the intensity of the light. For instance, the illumination device 100 provides pre-set light intensity settings of low, medium, and high. Further, the illumination device 100 allows the user 105 to adjust the color and/or pattern of illumination among other examples. In one example, the lighting and/or appearance of the illumination device 100 is arranged with particular indicia, branding, and/or color schemes for use at conventions, concerts, amusement parks, and/or other events.

Figure 2:
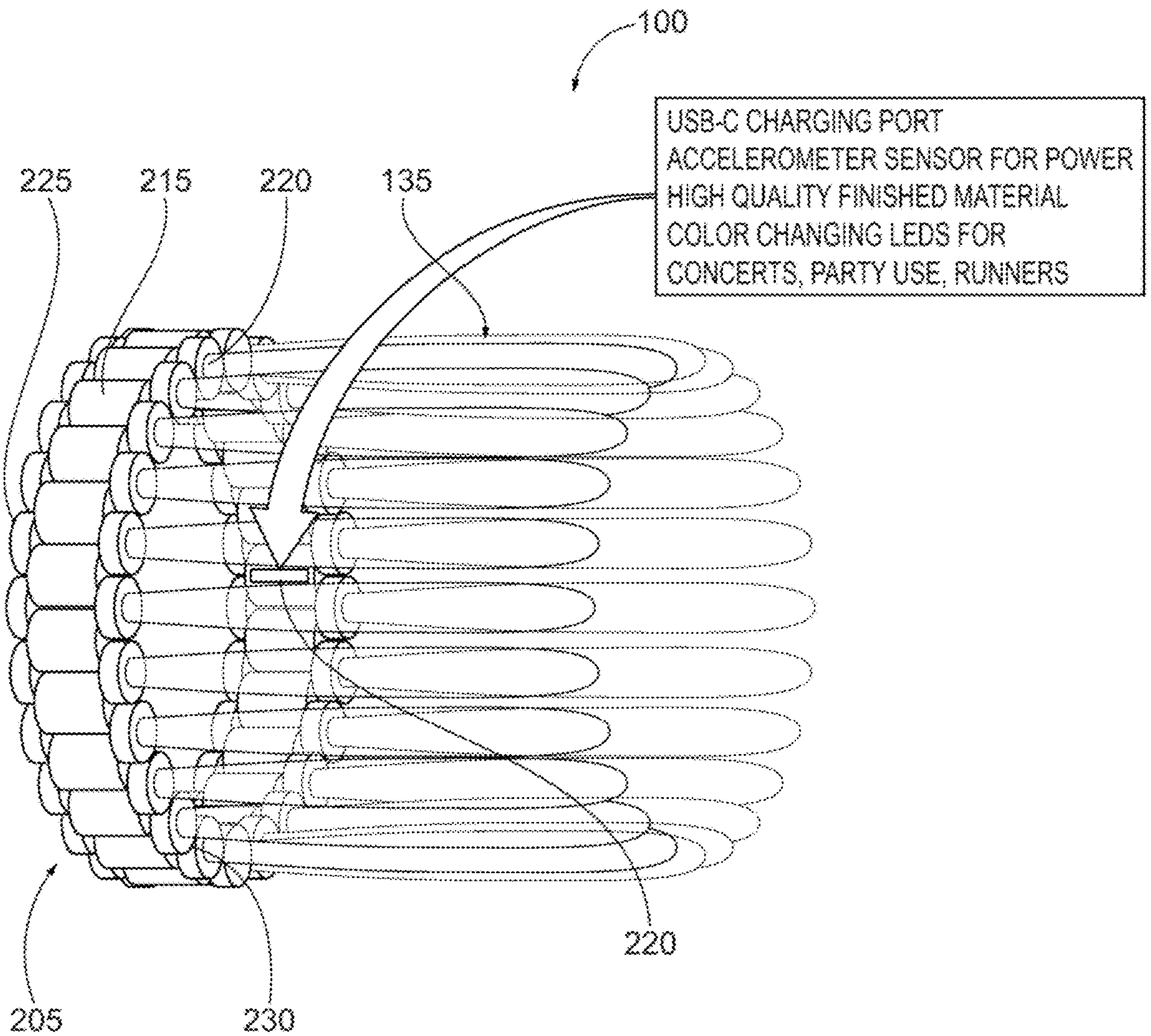
FIG. 2 is a front perspective view of the FIG. 1 illumination device.
Figure 3:
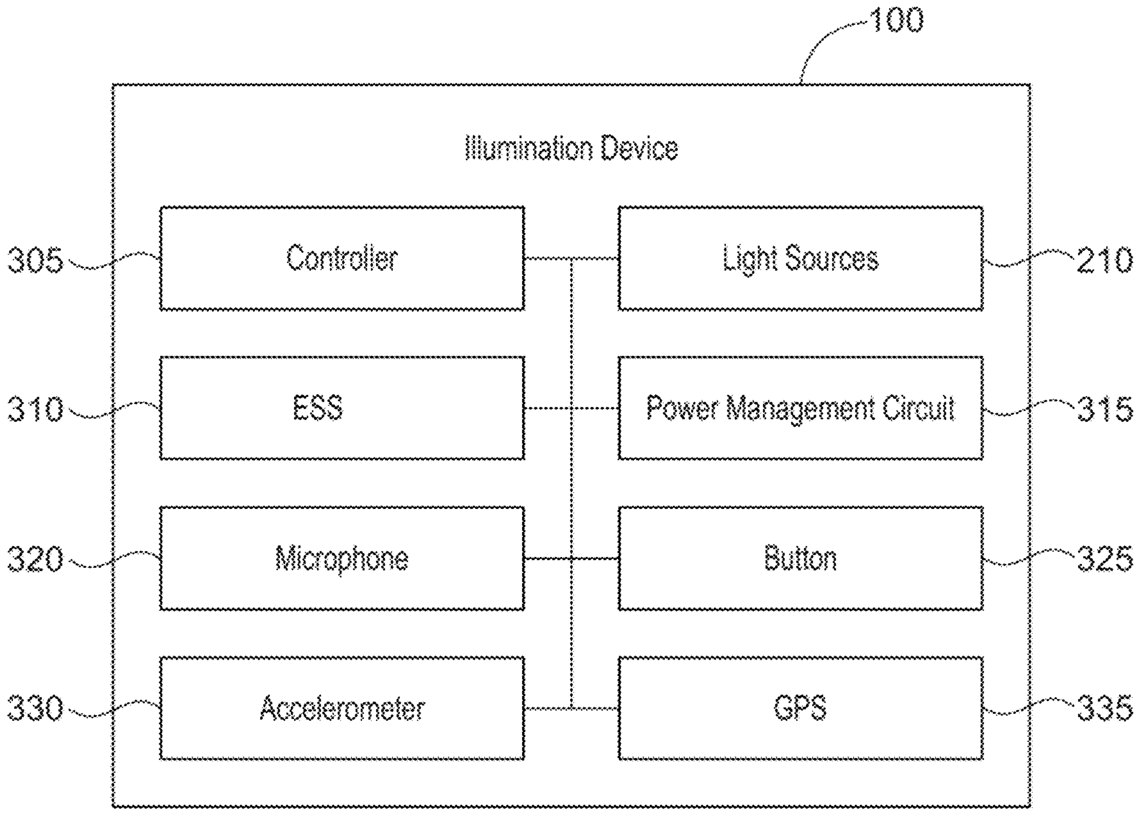
FIG. 3 is a diagram of the FIG. 1 illumination device.
Figure 4:
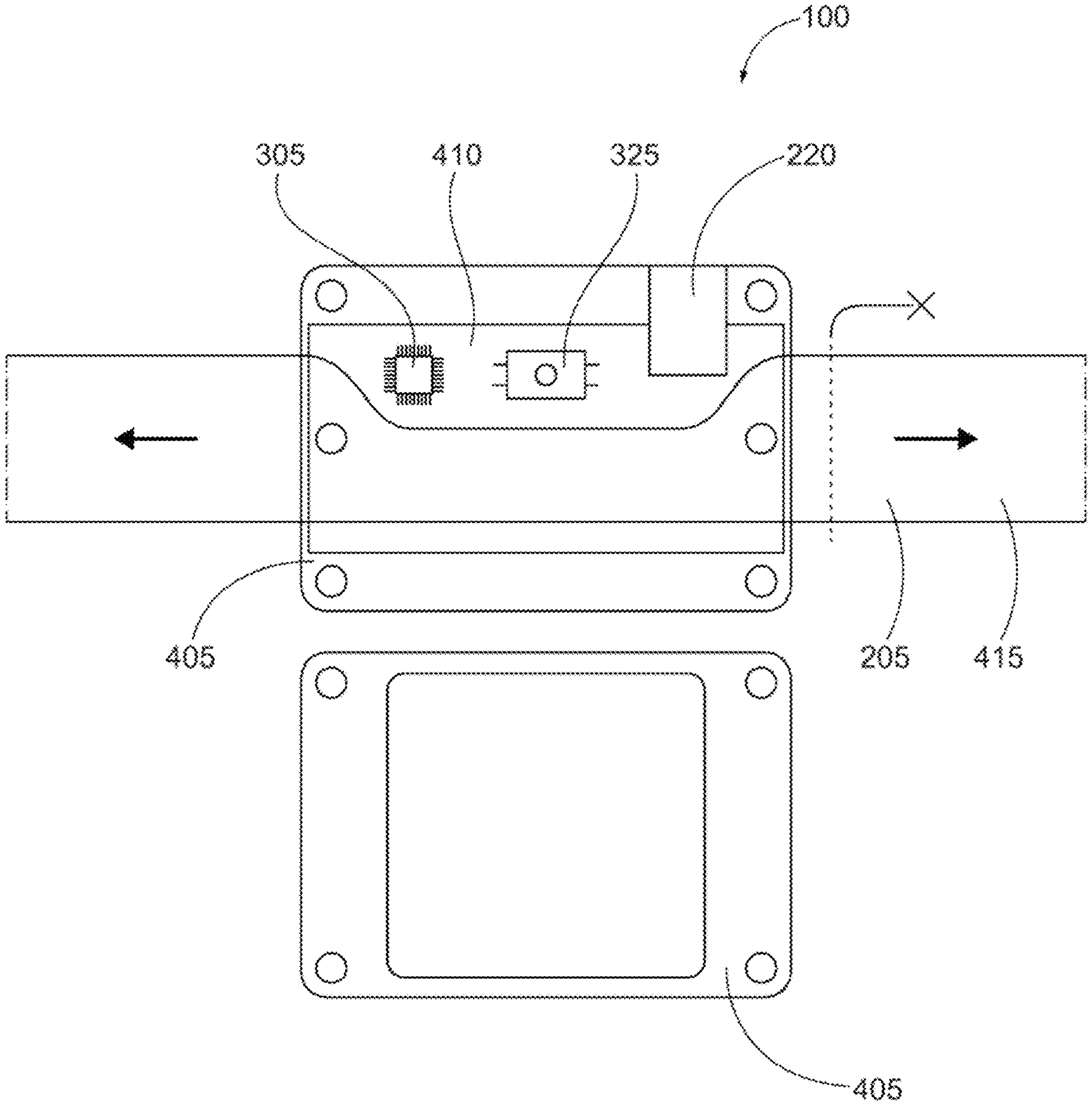
FIG. 4 is a top view of the FIG. 1 illumination device according to another example.
Figure 5:
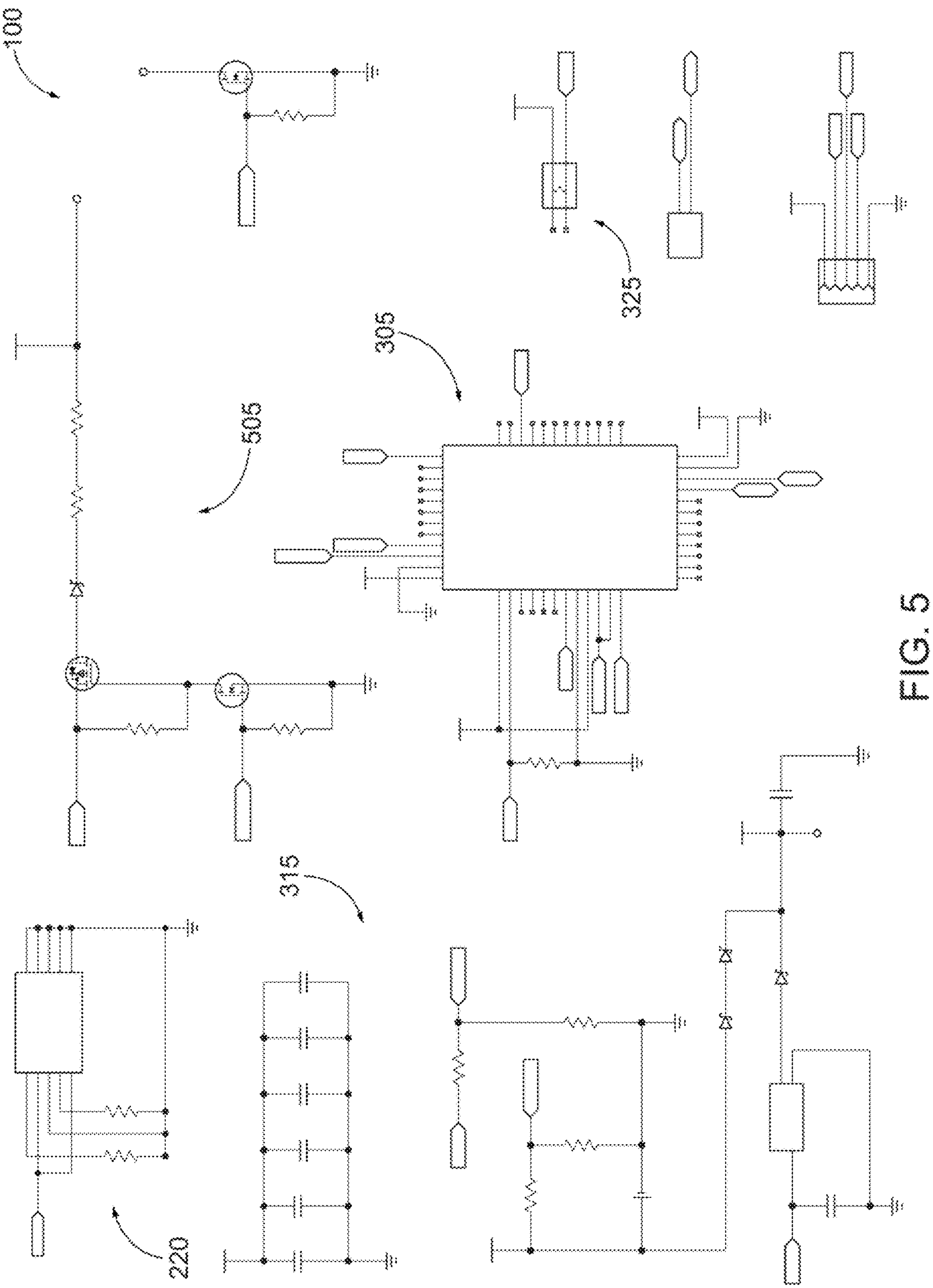
FIG. 5 is a schematic of the FIG. 1 illumination device according to another example.
Figure 6:
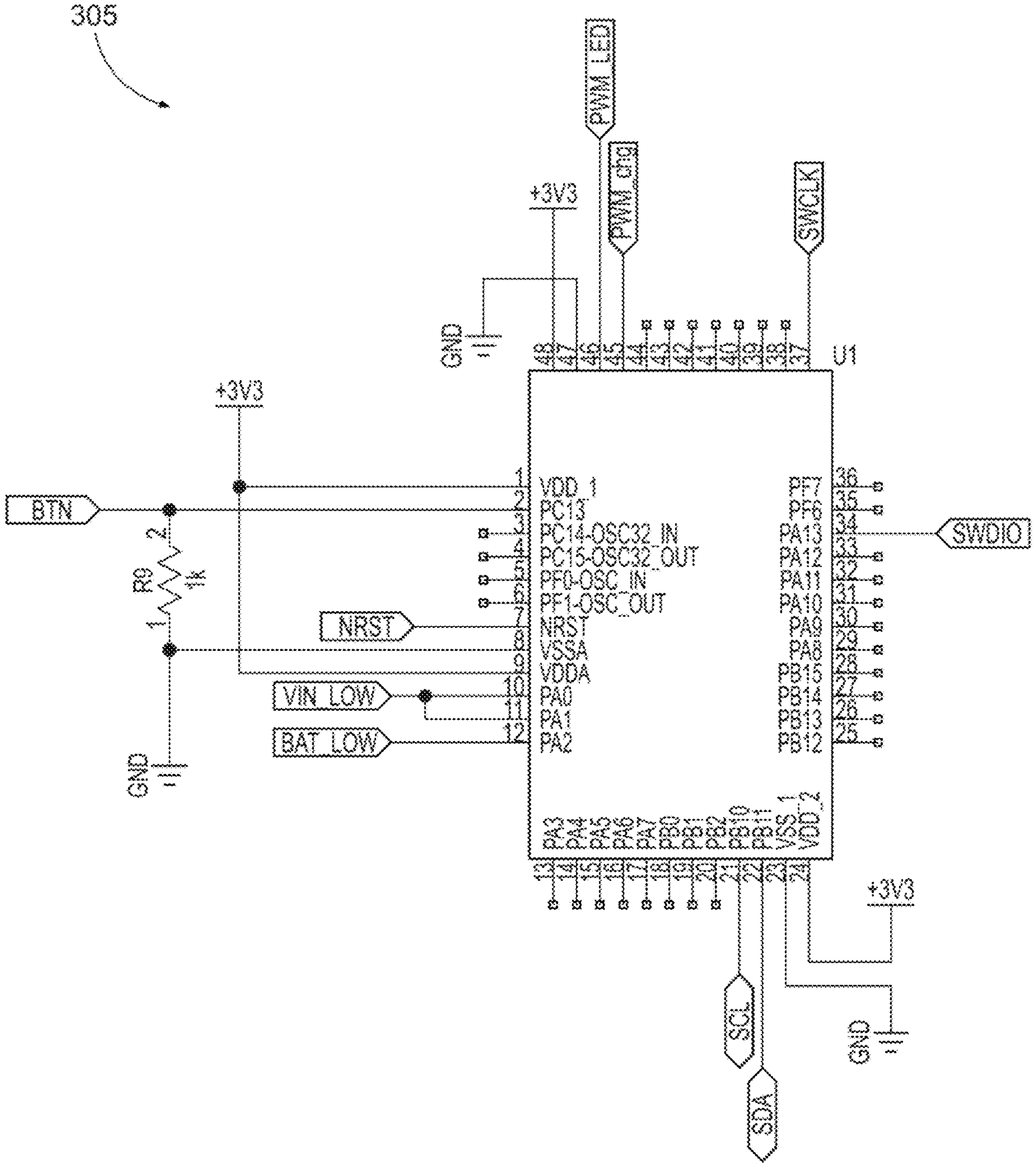
FIG. 6 is a schematic of a controller used in the FIG. 1 illumination device according to one example.
Figure 7:
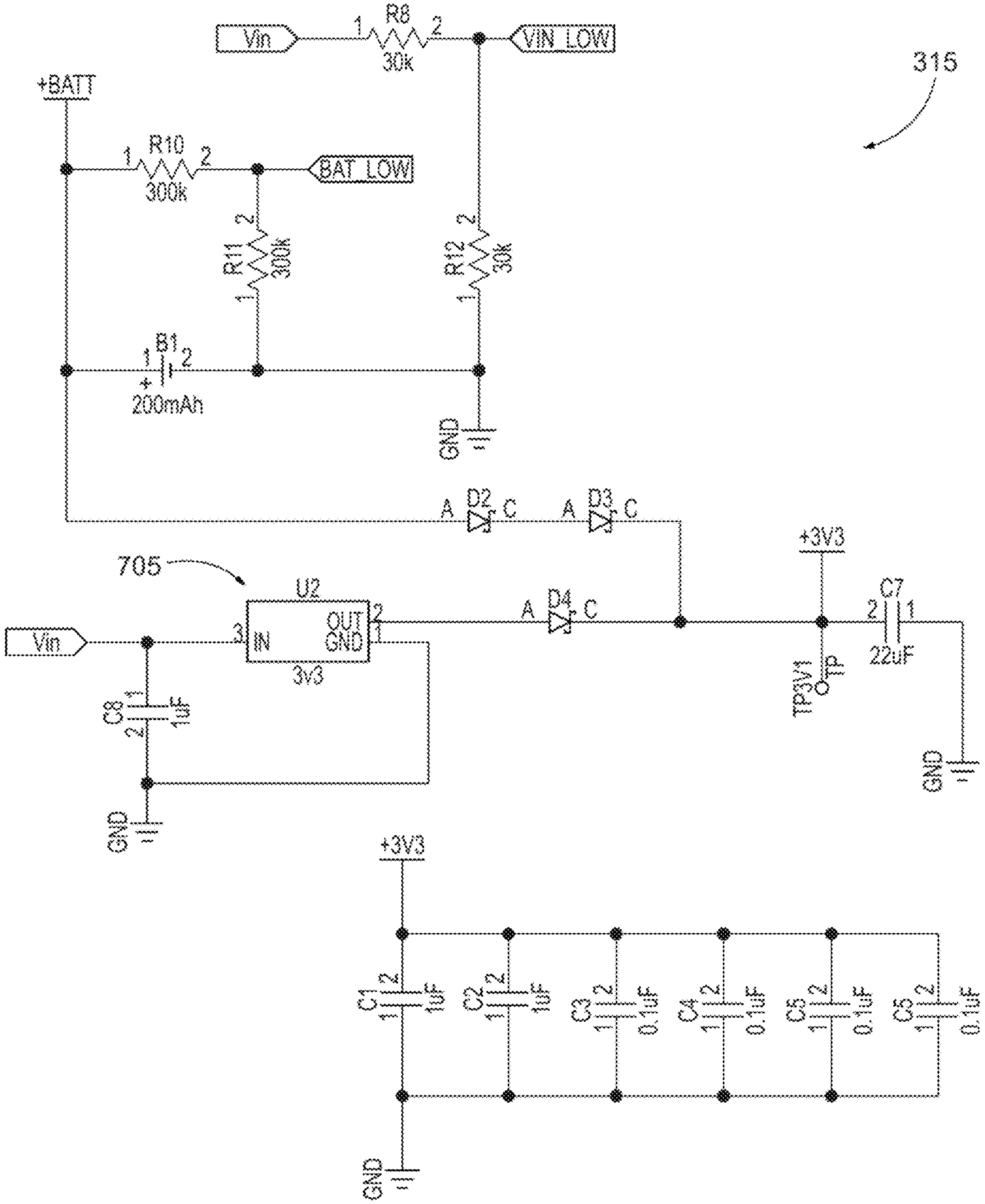
FIG. 7 is a schematic of a power management circuit used in the FIG. 1 illumination device according to one example.
Figure 8:
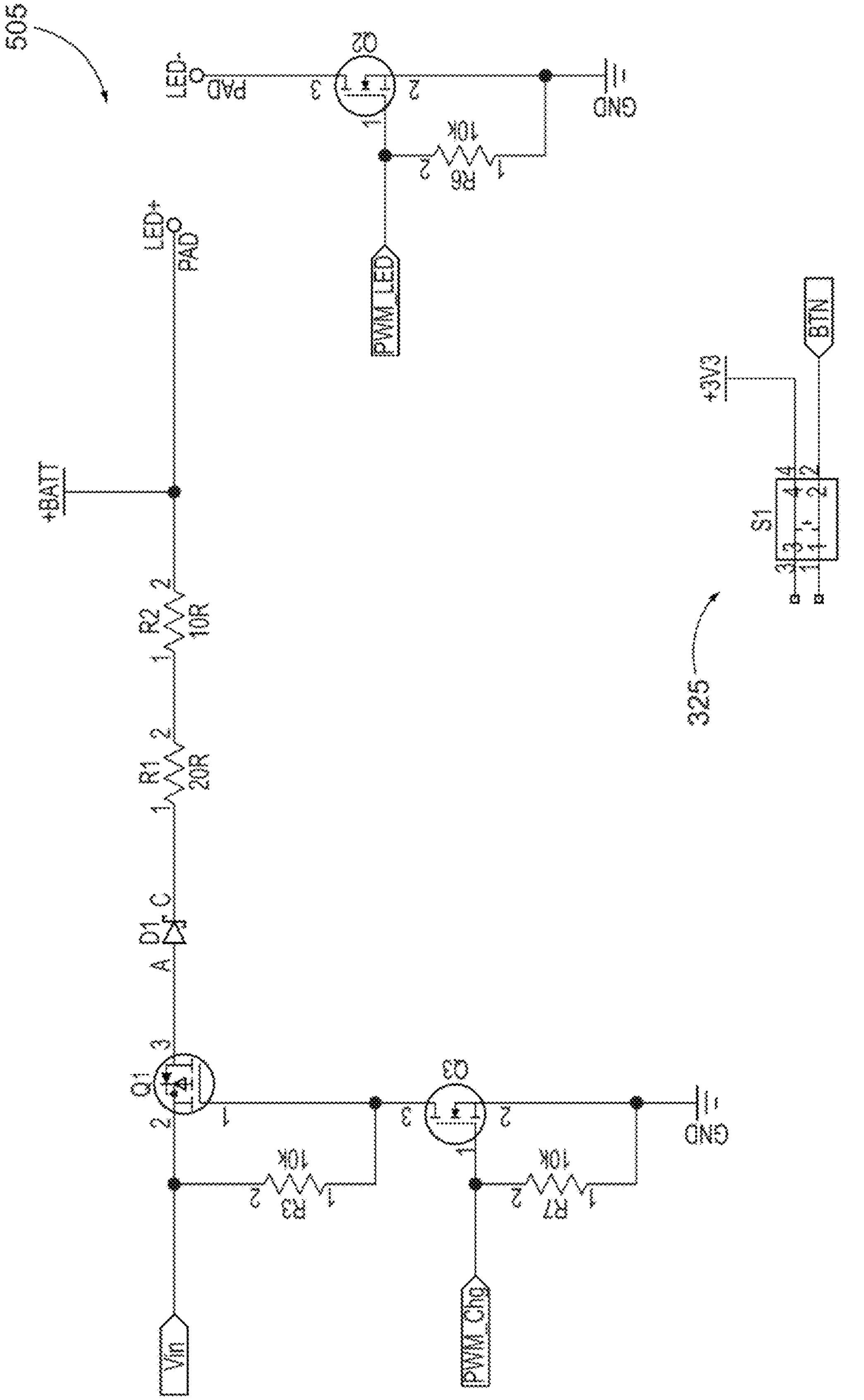
FIG. 8 is a schematic of a light control circuit used in the FIG. 1 illumination device according to one example.
Figure 9:
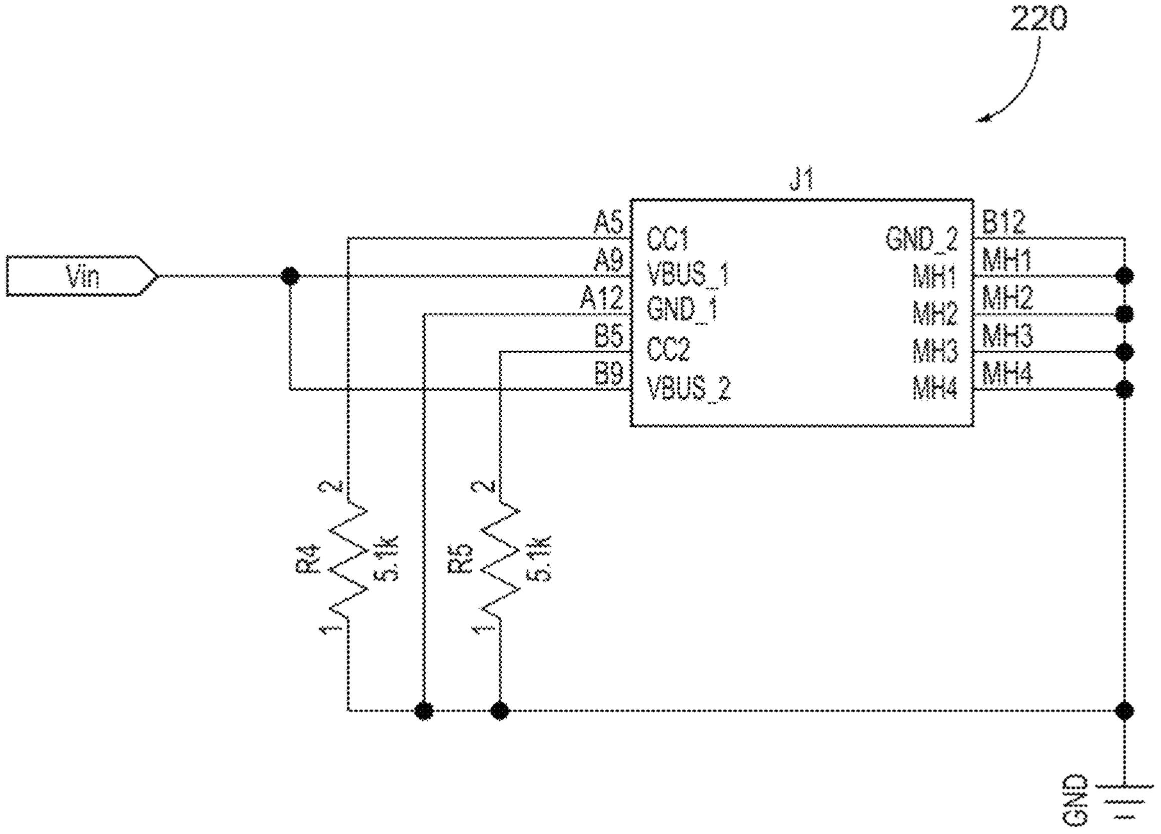
FIG. 9 is a schematic of an electrical port used in the FIG. 1 illumination device according to one example.

Looking at FIGS. 2 and 3, the illumination device 100 generally includes a band 205, one or more light sources 210, a controller 305, and an energy storage system (ESS) 310. The band 205 generally secures the illumination device 100 to the user 105. The light sources 210 are configured to illuminate the area around the device. The controller 305 is configured to operate the light sources 210 in a variety of ways, such as based on the selected lighting mode. The ESS 310, such as one or more batteries, provides power to the illumination device 100. The ESS 310 further helps the illumination device 100 to be portable and easily wearable.

In one version depicted in FIG. 2, the band 205 includes multiple links 215, such as metal links 215. When worn on the wrist 125, the band 205 has a proximal edge 225 that faces the arm 120 and a distal edge 230 that faces the hand 130. As shown, the light sources 210 are positioned to shine the light from the distal edge 230 of the band 205. The links 215 are configured to couple to the light sources 210 and/or neighboring links 215 to form the band 205. In some cases, the lights sources have light guides, such as fiber optic cables, that route the light through and/or around the band 205. The length of the band 205 is typically adjustable by removing and/or adding links 215. In another version, the band 205 is formed from a continuous strip of material. In one example, the band 205 is made of silicone. In other examples, the band 205 is made of but not limited to leather, fabric, nylon, rubber, and/or a combination of materials. In one example, the band 205 is adjustable for size. In yet another version, the band 205 includes a slap bracelet. The slap bracelet is configured to conform around the wrist 125 of the user 105 when slapped against the wrist 125. The slap bracelet typically includes a flat flexible metal strip covered in fabric and/or silicone. In an initial position, the slap bracelet is generally straight and rigid. When the user 105 hits the slap bracelet against the wrist 125 with sufficient force, the slap bracelet wraps around the wrist 125.

Referring to FIGS. 2-5, the light sources 210 in one variation are in the form of light emitting diodes (LEDs). The LEDs are typically configured to emit multiple colors of light. For instance, the light sources 210 include multiple types of LEDs that emit light at different wavelengths. In one example, the light sources 210 are arranged along the band 205. For instance, the light sources 210 are coupled together through the links 215. In another example, the light sources 210 are arranged in a centralized location on the illumination device 100, such as in a housing 405. The illumination device 100 typically further includes a light control circuit 505. The light control circuit 505 facilitates operation of the light source 210 by the controller 305. For example, the light control circuit 505 includes multiple switches and/or other components that allow the controller 305 to connect and/or disconnect one or more of the light sources 210 from the ESS 310.

Looking at FIGS. 3-9 the illumination device 100 further includes a power management circuit 315. The power management circuit 315 is configured to regulate electrical power flowing from the ESS 310 to other components and to control charging of the ESS 310. In one example, the illumination device 100 includes an electrical port 220. For example, the electrical port 220 is in the form of a USB, USB-C, and/or another type of port. The electrical port 220 allows the illumination device 100 to receive power through a wired connection to charge the ESS 310. In another example, the illumination device 100 includes a wireless charging pad, such as an inductive charging coil. The power management circuit 315 is configured to control and monitor charging of the ESS 310 based on power received through the electrical port 220, inductive charging coil, and/or another device. Further, the power management circuit 315 typically includes a voltage regulator 705. The voltage regulator 705 is configured to convert and/or maintain a voltage of electrical power from the ESS 310 at a suitable level for the controller 305, the light sources 210, and/or other components.

In one example, the illumination device 100 is configured to receive inputs through a button 325. The button 325 is connected to the controller 305. As should be appreciated, the controller 305 is configured to utilize the button 325 in the form of a switch, push-button, and/or other type of tactile input. The controller 305 is configured to operate the light sources 210 based on inputs from the button 325. In one example, the push button 325 is configured to activate the light from an off state when the button 325 is pressed. In another example, the controller 305 is configured to change the settings for the light sources 210 when the push button 325 is pressed multiple times repeatedly and/or held for a period of time. In yet another example, the controller 305 includes multiple buttons 325 that each provide an input to adjust different settings, such as light mode, brightness, and/or color.

In one version, the illumination device 100 further includes a microphone 320. The microphone 320 allows the illumination device 100 to receive voice commands and/or other sound-based commands. The controller 305 is configured to operate the light sources 210 based on inputs from the microphone 320, such as changing the light mode, intensity, and/or color based on sound. In one example, the controller 305 is configured to synchronize the light sources 210 to the rhythm and/or pitch of music. At concerts and/or in other settings, the synchronization enhances the visual experience for attendees.

In one version, the controller 305 further includes an Inertial Measurement Unit (IMU), such as in the form of an accelerometer 330. The accelerometer 330 is configured to provide inputs to the controller 305 based on movement of the user 105, such as flicking the wrist 125 and/or raising the arm 120 as examples. The controller 305 is therefore configured to adjust the light based on user 105 movement. For example, the controller 305 can turn on, change colors, and/or flash the lights when the user 105 raises the hand 130 with the illumination device 100. Further, raising hands 130 to activate the light typically assists locating the user 105 in a crowded environment. In another example, the controller 305 is configured to adjust the lights based on impacts to the illumination device 100. For instance, the controller 305 is configured to operate the light sources 210 in a particular way when the user 105 hits the illumination device 100.

In another version, the illumination devices 100 are configured to work in pairs and/or in other multiples, such as with one illumination device 100 worn on each wrist 125. In one example, two illumination devices 100 are configured to activate specific light modes when used together. For example, the controller 305 is configured to activate a specific light mode, such as a concert mode, when two illumination devices 100 are hit together. In one version, concert mode includes flashing lights and changing colors. The IMU or accelerometer 330 is able to detect sudden movement or stopping, and based on this information, the controller 305 changes the operational mode of the light sources 210.

In one version, the illumination device 100 further includes a satellite navigation device or chip, such as a global positioning system (GPS) 335. The GPS 335 generally allows the illumination device 100 to monitor the location of the user 105. In one example, the illumination device 100 is configured to track movement of the user 105 using the GPS 335. For instance, the GPS 335 allows runners to measure the distance and/or track the path traveled during a run. In another example, the controller 305 of the illumination device 100 is configured to control the light sources 210 based on the location of the user 105. In some cases, venues such as sports arenas and/or concert halls plan visual displays that utilize lighting from personal devices of users 105. In one example, the controller 305 of the illumination device 100 is configured to control the light sources 210 in cooperation with such visual displays when the GPS 335 detects the user 105 is at the venue. Using such location-based light control creates an immersive experience for audience members wearing the illumination device 100.

In some examples, the illumination device 100 further includes a speaker. The speaker is configured to produce sound in a variety of ways. In one example, the speaker is configured to provide audio feedback when the user 105 switches between modes. In another example, the speaker is configured to play sound effects and/or other noises as a part of operating. In yet another example, the speaker is configured to play music, such as when synchronized to an external device and/or at an event. The controller 305 is configured to control the speaker in a variety of ways in combination with the light sources 210.

The illumination device 100 supports a variety of physical arrangements of components. In one example, the illumination device 100 includes one or more circuit boards, such as a first board 410 in a housing 405 and a second board 415 that extends along the band 205. In one example, the second board 415 is in the form of a flexible printed circuit board (PCB). The flexible PCB allows the second board 415 to bend with the band 205. In one example, the light sources 210 are all mounted and/or connected to the flexible PCB. The light sources 210 each have a housing 405 and/or extend from the band 205 when attached to the flexible PCB. In another example, the controller 305, the ESS 310, the electrical port 220, and/or other components are attached to the flexible PCB. In an alternate example, the controller 305, the ESS 310, and/or the electrical port 220 are attached to a rigid PCB in a rigid housing 405.

Figure 10:
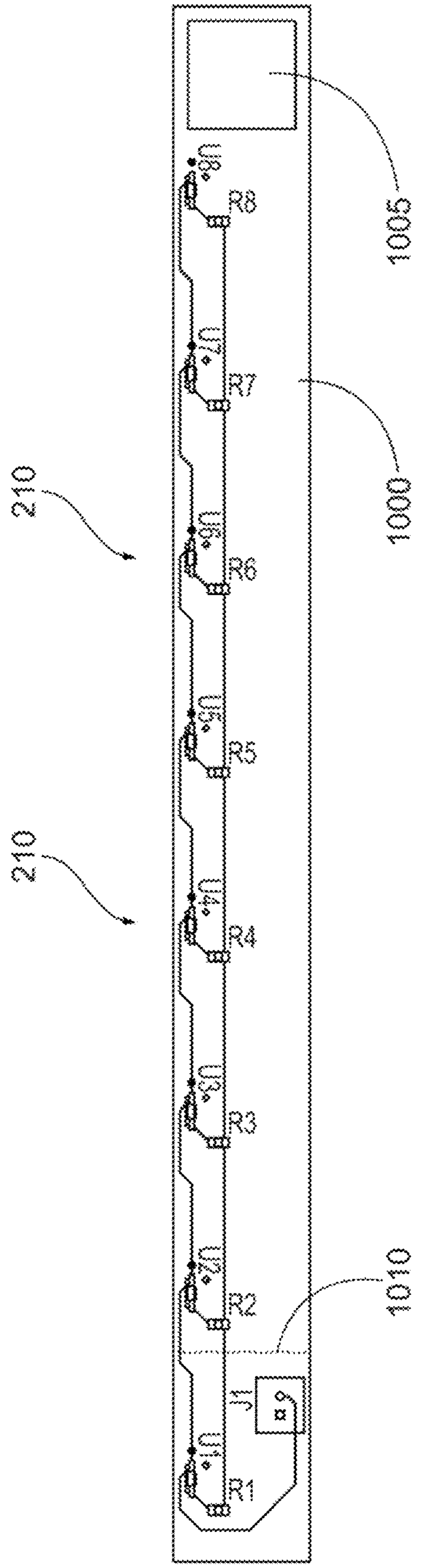
FIG. 10 is a top view of a disposable or tamper evident wristband according to one example.

FIG. 10 shows a disposable wristband 1000 according to another example. The wristband 1000 in this case is in the form of a strap. In one version, the wristband 1000 is made of flash-spun high-density polyethylene (HDPE) fibers, which is commonly called by the brand name TYVEK® (Dupont Safety and Construction, Inc.). This synthetic material feels like paper but is highly durable, tear-resistant, and waterproof. The wristband 1000 can be made from other materials in other variations like paper. The wristband 1000 includes a closure in the form of an adhesive 1005 at one end that adheres to another end so as to loop around the wrist. The closure can take other forms, such as a rivet or other permanent fastener. In some cases, the wristband 1000 is a tamper-evident wristband that includes a weakened area, such as die cuts or security cuts 1010, where the wristband 1000 typically breaks during removal. The wristband 1000 in other variations does not include the security cuts 1010. The wristband 1000 is generally designed to be a single-use or disposable device, which can be used at events, concerts, bars, amusement parks, and the like.

Figure 11:
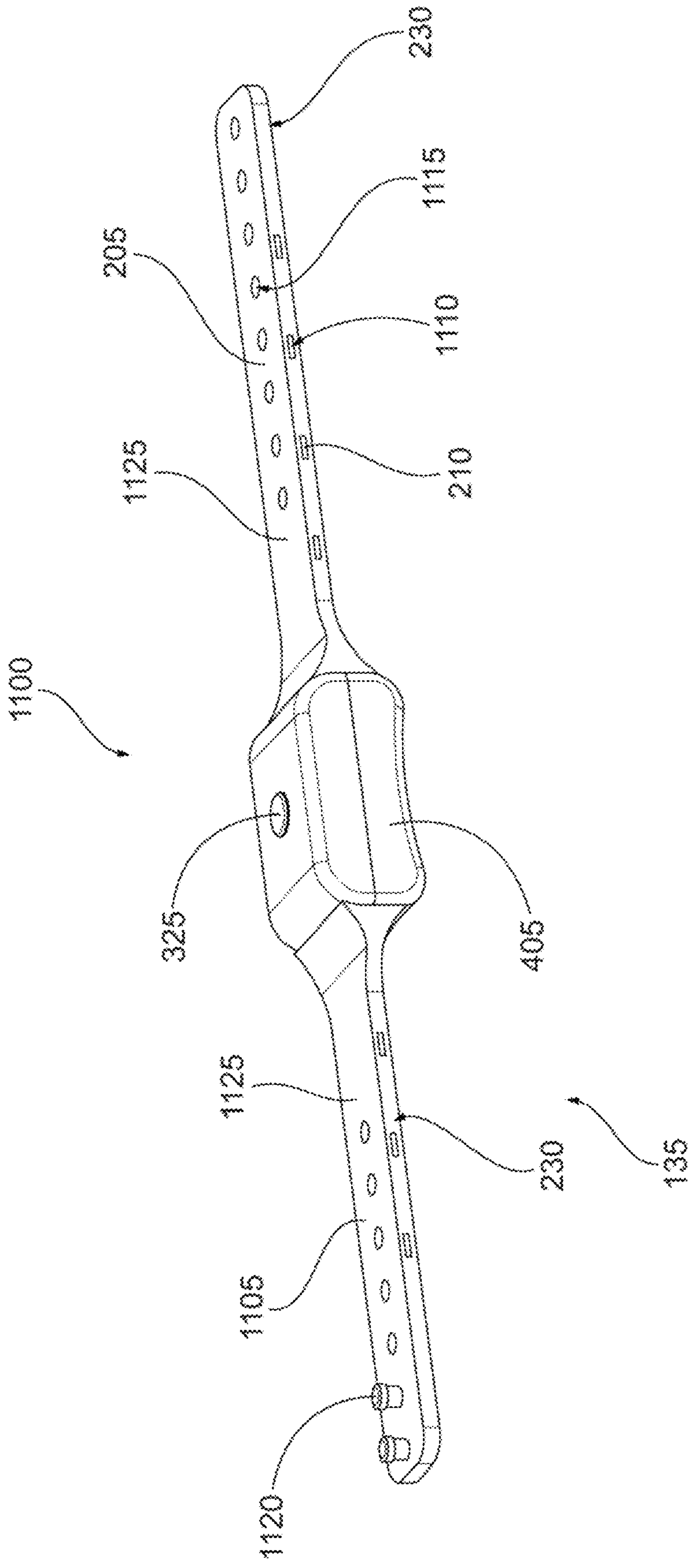
FIG. 11 is a front perspective view of an illumination device according to another example.
Figure 12:
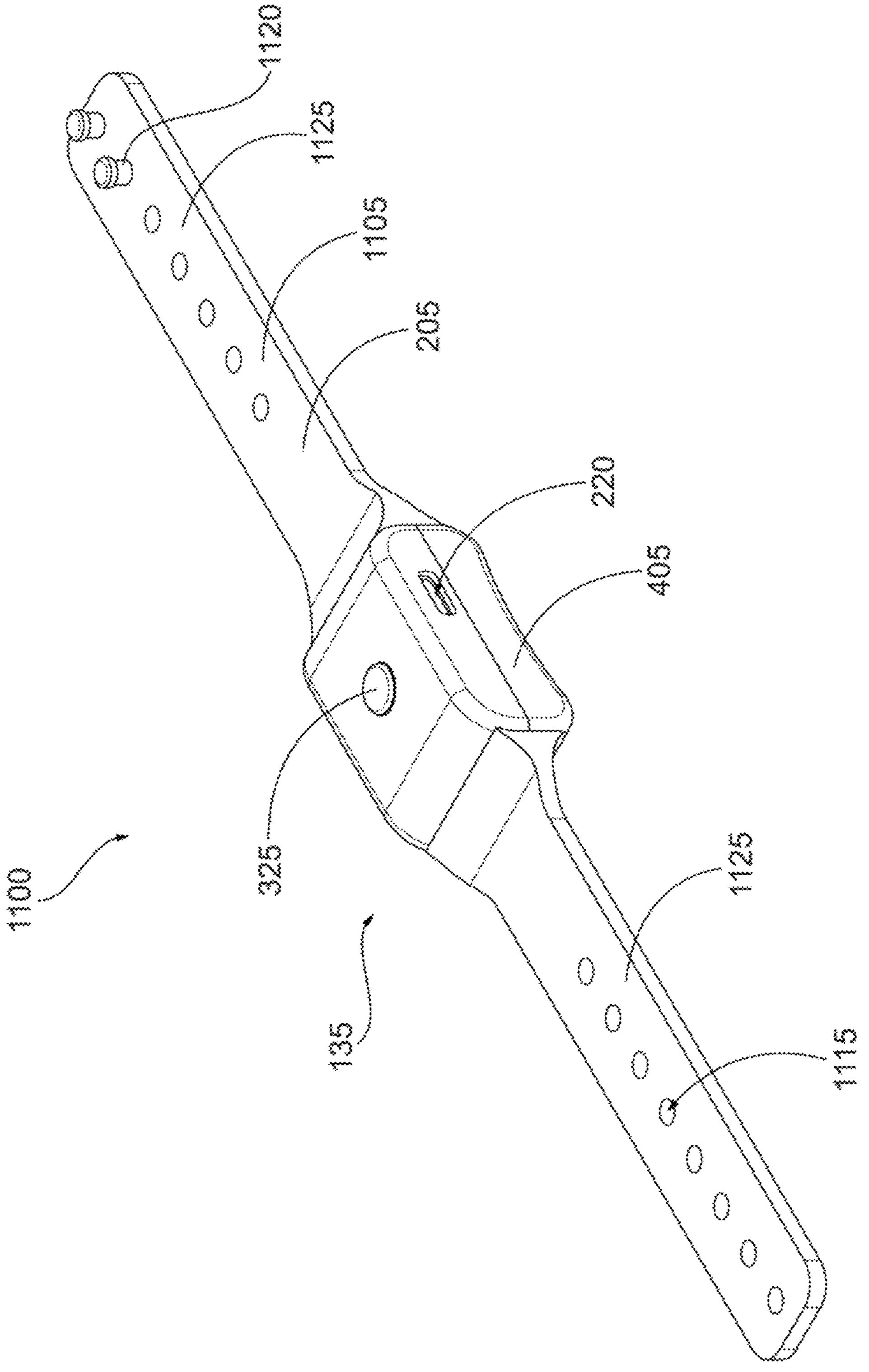
FIG. 12 is a rear perspective view of the FIG. 11 illumination device.
Figure 13:
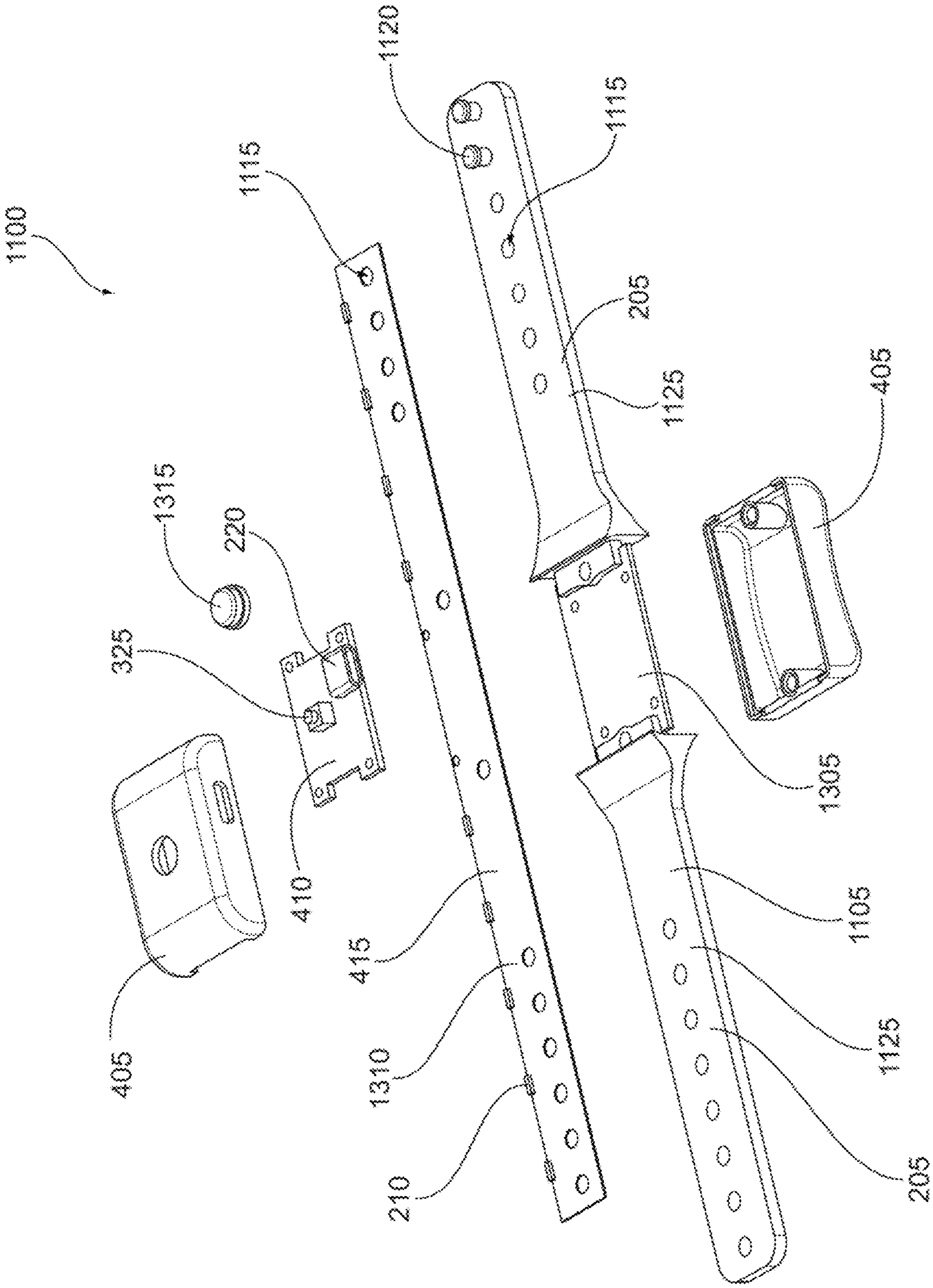
FIG. 13 is an exploded perspective view of the FIG. 11 illumination device.

Referring to FIGS. 11, 12, and 13, an illumination device 1100 according to another example is illustrated. The illumination device 1100 is generally configured to operate in the same or similar ways as the illumination device 100 described previously with respect to FIGS. 1-10. For example, the illumination device 1100 is configured to attach around the wrist 125 of the user 105 and to illuminate in a direction toward the hand 130 and along the longitudinal axis 145, as illustrated in FIG. 1. Further, the illumination device 1100 generally includes the same and/or similar components as the illumination device 100, such as the band 205, the light sources 210, the electrical port 220, the housing 405, and the button 325 as examples. In the FIG. 11 example, the band 205 includes a flexible band 1105. The flexible band 1105 is generally made of flexible material, such as rubber, silicone, plastic, and/or another material. Using the flexible band 1105 generally simplifies manufacturing of the illumination device 1100.

As illustrated, the illumination device 1100 defines one or more slots 1110, defines one or more holes 1115, and includes one or more studs 1120. The slots 1110 provide space for the light sources 210 within the band 205. Further, the slots 1110 generally open toward the distal end 135 and allow the light sources 210 to illuminate in that direction. By recessing the light sources 210 into the band 205 in this way, the band 205 generally retains a cohesive outer shape. For example, recessing the light sources 210 in the slots 1110 allows the band 205 to have the same or similar feel to a traditional watch band and/or flexible bracelet.

The holes 1115 and the stud 1120 are configured to secure the band 205 around the wrist 125 of the user 105. As shown, the band 205 defines the holes 1115, and the stud 1120 is positioned on the band 205. The holes 1115 are configured to receive the stud 1120. When the stud 1120 is positioned in the hole 1115, corresponding portions of the band 205 are held together. In one example, a tip of the stud 1120 is larger than the rest of the stud 1120. In this example, the stud 1120 is configured to snap into the hole 1115. In another example, the hole 1115 and the stud 1120 are configured to couple together through a friction fit. As noted, the band 205 generally includes multiple holes 1115. The multiple holes 1115 allow the user 105 to select the length of the band 205 when wrapped around the wrist 125. In one example, the holes 1115 are spaced apart in consistent intervals along the band 205. Further, in the illustrated example, the band 205 includes multiple studs 1120. In one example, the studs 1120 are spaced apart by the same interval as the holes 1115. In such an example, the multiple studs 1120 are configured to couple to multiple holes 1115 on another portion of the band 205. Coupling multiple studs 1120 to multiple holes 1115 generally ensures that the band 205 remains fastened around the wrist 125 of the user 105.

As shown, the flexible band 1105 includes multiple band segments 1125. The band segments 1125 are generally positioned on either lateral side of the housing 405. For example, each of the band segments 1125 is configured to couple to the housing 405 on opposite sides. In an alternate example, the flexible band 1105 extends continuously through the housing 405.

As illustrated in FIG. 13, the illumination device 1100 further includes a support plate 1305. The support plate 1305 is made of a generally rigid material, such as a hard plastic. In one example, the support plate 1305 is configured to flex to some degree without breaking. The support plate 1305 provides structural support for the first board 410 within the housing 405. In one example, one or more components are mounted to the support plate 1305 within the housing 405, such as the controller 305, the ESS 310, and/or the microphone 320 as examples. Further, the support plate 1305 provides support for the second board 415 within the housing 405. For instance, the support plate 1305 extends through the housing 405 and along the band 205 on either side of the housing 405. The support plate 1305 is configured to support a central portion of the second board 415. The first board 410 and the second board 415 are electrically connected, such as through one or more electrical pins, contactors, connectors, and/or other terminals. Supporting the first board 410 and the second board 415 using the support plate 1305 helps to ensure that the first board 410 and the second board 415 remain electrically connected.

In one version, the band segments 1125 are detachable from the support plate 1305 and/or the housing 405. For example, the band segments 1125 are configured to removably couple to a smart watch and/or another commercially available device worn on the wrist. In that example, the housing 405 and/or the support plate 1305 are configured to removably couple to one or more bands from such a smart watch and/or other device. In another version, the band segments 1125 are integrally formed and/or fused with the support plate 1305. For example, the flexible band 1105 is formed as a single part including the band segments 1125 and the support plate 1305. As some examples, the band segments 1125 and the support plate 1305 are formed as a unitary part through molding, the band segments 1125 and the support plate 1305 are formed separately and are fused together, and/or the flexible band 1105 is formed using another process. In one example, the band segments 1125 are formed around the second board 415. For instance, the second board 415 is positioned in a mold and then the band segments 1125 are formed around the second board 415 within the mold. In another example, the band segments 1125 define a channel that is shaped to receive the second board 415.

In the FIG. 13 example, the second board 415 is in the form of a wristband 1310. The wristband 1310 is generally a flexible strip that extends along most or all of the band 205. In one example, the wristband 1310 includes the wristband 1000 shown in FIG. 10. The wristband 1310 defines the holes 1115. Because the wristband 1310 is generally positioned within the band 205, the holes 1115 generally extend through both the wristband 1310 and the band 205. Such an arrangement of the holes 1115 allows the stud 1120 to extend fully through the band 205 via the holes 1115.

As noted, the electrical port 220, the controller 305, the button 325, and/or other components are mounted on the first board 410 within the housing 405. Mounting such components on the first board 410 provides a fixed structure to ensure reliable electrical connections. Further, such components are generally accessible to the user 105 at the housing 405. For example, the button 325 is positioned on a top side of the housing 405 in an accessible location for the user 105. As another example, the electrical port 220 is typically unobstructed on a lateral side of the housing 405 to connect to an external power source and/or another device. The light sources 210 are generally mounted on the second board 415. Mounting the light sources 210 on the second board 415 allows the light sources 210 to move with the band 205 and wrap around the wrist 125 of the user 105. As should be appreciated, the illumination device 1100 is configured to utilize any arrangement of components. In another version, one or more light sources 210 are mounted to the first board 410 and/or on the housing 405.

The illumination device 1100 further includes a button cap 1315. The button cap 1315 is coupled to and/or is a part of the button 325. The button cap 1315 generally facilitates the user 105 to press the button 325. For example, the button cap 1315 provides a large and/or easily accessible area for the user 105 to push. In one example, the button cap 1315 is configured to illuminate. In such an example, the illumination device 1100 includes one or more light sources 210 in the housing 405 and/or in the button cap 1315. In one example, the button cap 1315 is translucent to allow light to pass through. Illuminating the button 325 in this way allows the illumination device 1100 to provide visual feedback to the user 105. For example, the illumination of the button 325 and/or other light sources 210 on the housing 405 allows the illumination device 1100 to communicate to the user 105 a mode of operation, a status of the ESS 310, and/or other information.

Figure 14:
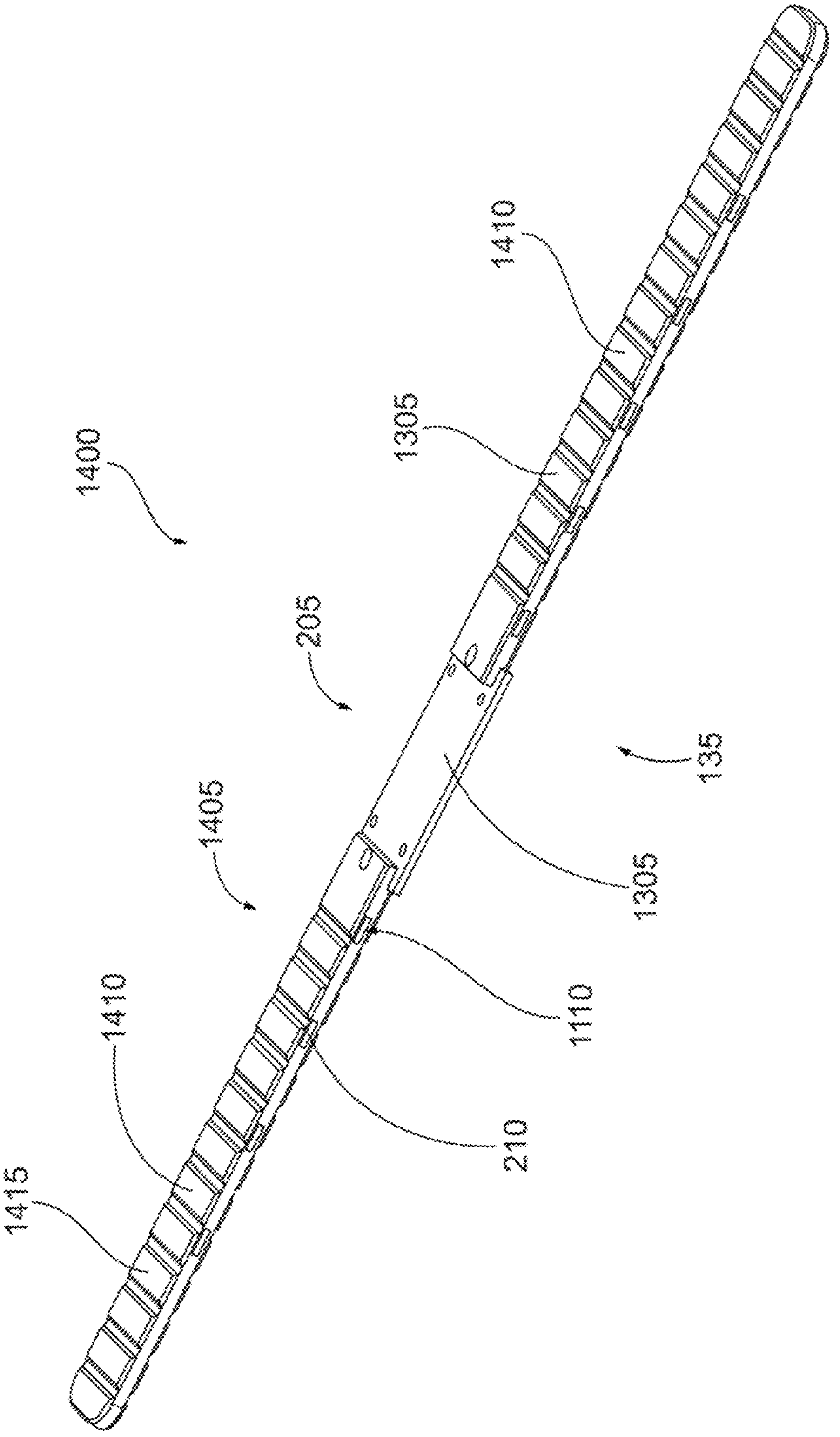
FIG. 14 is a perspective view of an illumination device according to yet another example.
Figure 15:
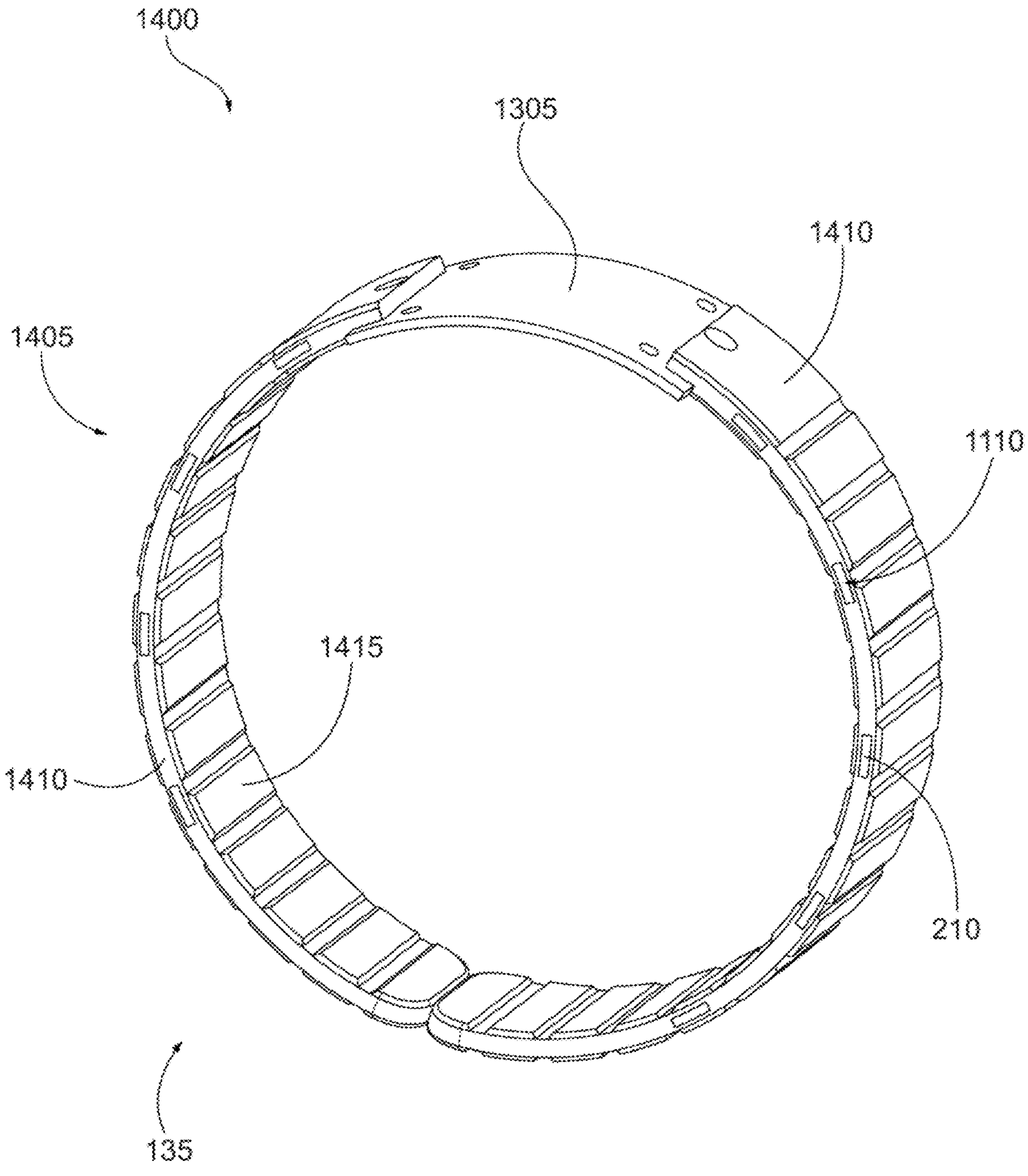
FIG. 15 is a perspective view of the FIG. 14 illumination device in a contracted configuration.

FIGS. 14 and 15 illustrate an illumination device 1400, another example of the illumination device 100 shown in FIG. 1 and the illumination device 1100 shown in FIG. 11. The illumination device 1400 is generally configured to operate in the same or similar ways as the FIG. 1 illumination device 100 and as the FIG. 11 illumination device 1100 described previously. For example, the illumination device 1400 is configured to attach around the wrist 125 of the user 105 and to illuminate in a direction toward the hand 130 and along the longitudinal axis 145, as illustrated in FIG. 1. Further, the illumination device 1400 generally includes the same and/or similar components as the illumination device 100 and/or the illumination device 1100, such as the band 205, the light sources 210, the electrical port 220, the housing 405, and the button 325 as examples.

In one example, the band 205 in the illumination device 1400 is formed as a unitary part. The band 205 in the illumination device 1400 is configured to couple to the housing 405 in the same way as in the FIG. 11 example. Further, the illumination device 1400 includes multiple light sources 210 in the band 205. The band 205 defines multiple slots 1110 for the light sources 210. In one example, the light sources 210 are mounted to the second board 415 and the second board 415 extends through the band 205.

In the FIG. 14 example, the band 205 includes a slap bracelet 1405 and multiple band segments 1410. The slap bracelet 1405 is generally bistable in an extended configuration and in a contracted configuration. FIG. 14 illustrates the slap bracelet 1405 in the extended configuration, such as when the illumination device 1400 is not being worn by the user 105. FIG. 15 illustrates the slap bracelet 1405 in the contracted configuration. In the contracted configuration, the slap bracelet 1405 is configured to wrap around the wrist 125 of the user 105. For example, when the user 105 slaps the slap bracelet 1405 against the wrist 125, the slap bracelet 1405 deforms and wraps around the wrist 125. The band segments 1410 are configured to overlap around the wrist 125 to automatically adjust the size of the band 205. Using the slap bracelet 1405 allows the wrist 125 to quickly attach the illumination device 1400 to the wrist 125 without needing much dexterity. For example, the slap bracelet 1405 generally facilitates children, elderly, disabled, and/or others lacking fine motor control to secure the illumination device 1400 around the wrist 125. Alternatively or additionally, the band 205 includes a malleable spine, such as a bendable wire or strip, that allows the user 105 to reshape the band 205 around the wrist 125 to secure the illumination device 1400 on the user 105.

In one example, the band segments 1410 and the support plate 1305 are integrally formed. In another example, the band segments 1410 and the support plate 1305 are separate parts. In the illustrated example, the band 205 further includes multiple integral links 1415 on the band segments 1410. The integral links 1415 are integrally formed as a part of the band segments 1410. The integral links 1415 are generally similar to the links 215, as shown in FIG. 1. However, the integral links 1415 are connected together through the band segment 1410 as a unitary piece of material. In one example, the integral links 1415 provide grip against the wrist 125 of the user 105. In another example, the integral links 1415 stiffen the band 205 at various points while allowing the band 205 to flex between the integral links 1415. As should be appreciated, the illumination device 1400 is configured to utilize any shape and/or style of the band 205.

FIGS. 16, 17, 18, 19, 20, 21, 22, and 23 illustrate another example of an illumination device 1600. The illumination device 1600 is generally configured to be worn and used in the same way as the illumination device 100 in FIG. 1 and/or the illumination device 1100 in FIG. 11. The illumination device 1600 generally includes the same or similar components as the illumination device 100 shown in FIG. 1 and/or the illumination device 1100 shown in FIG. 11. For instance, the illumination device 1600 generally includes the band 205, the light sources 210, the electrical port 220, the microphone 320, the button 325, and/or other components described in previous examples. In the FIG. 16 example, the illumination device 1600 further includes a housing 1605 and a flexible band 1610. The housing 1605 is generally similar to the housing 405 shown in FIG. 11. The flexible band 1610 is generally similar to the flexible band 1105 shown in FIG. 11. For the sake of brevity as well as clarity, please refer to the previous description of these common features.

In one version, the illumination device 1600 is arranged as a standalone unit with a fixed construction. For example, the illumination device 1600 incorporates all the necessary components to perform one or more specialized functions. In one example, the band 205 and the housing 1605 are integrated to form the illumination device 1600 as a cohesive unit. In other words, the illumination device 1600 has a unitary construction having the band 205 and the housing 1605 coupled together in a fixed manner. In one example, the band 205 extends through the housing 1605. The band 205 is typically coupled to the housing 1605 in a nonremovable and/or permanent manner. For instance, the housing 1605 and/or other parts of the illumination device 1600 must be disassembled to disconnect the housing 1605 and the band 205. Using such an integrated construction helps the illumination device 1600 to be durable and to ensure reliable electrical connections between components in the housing 1605 and the light sources 210 in the band 205.

In the illustrated example, the housing 1605 includes a first cover 1615 and a second cover 1620. Using multiple pieces in the housing 1605 generally facilitates manufacturing of the illumination device 1600. In one example, the button 325 and/or other input devices are accessible on the first cover 1615. The first cover 1615 and the second cover 1620 are configured to couple together through one or more fasteners, by snapping together, using an adhesive, and/or in another way. In one example, the first cover 1615 and the second cover 1620 are coupled to the band 205 by clamping onto the band 205. As should be appreciated, the illumination device 1600 is configured to utilize a variety of types of construction of the housing 1605.

The flexible band 1610 is generally made of a flexible material, such as rubber, silicone, plastic, and/or another material. In one example, the flexible band 1610 includes multiple band segments 1625. In the illustrated example, one of the band segments 1625 extends from either lateral side of the housing 1605. The band segments 1625 are configured to couple together to secure the illumination device 1600 around the wrist 125 of the user 105. In one example, the band segments 1625 are configured to couple together magnetically.

The light sources 210 are generally contained and/or embedded within the band 205. For instance, the light sources 210 are recessed within the band 205 at the distal end 135. By containing the light sources 210 in the band 205, the light sources 210 are protected. Moreover, the illumination device 1600 has a slimmer profile which inhibits the illumination device 1600 from snagging on clothing or other items as well as minimizes the risk of the illumination device 1600 being damaged. In the FIG. 16 example, the flexible band 1610 defines multiple slots 1110, similar to the slots 1110 on the illumination device 1100 in FIG. 11. The slots 1110 generally provide space for the light sources 210 within the flexible band 1610. The slots 1110 generally open toward the distal end 135 and allow the light sources 210 to illuminate in that direction. The slots 1110 and the light sources 210 are generally arranged in the same way as described in previous examples.

In the illustrated example, the flexible band 1610 further defines one or more holes 1115, similar to the holes 1115 on the illumination device 1100 in FIG. 11. The holes 1115 are configured to help secure the band 205 around the wrist 125 of the user 105. For instance, the holes 1115 are configured to receive a clip or fastener used to hold the band segments 1625 together and fix the length of the flexible band 1610. In another example, the flexible band 1610 further includes one or more studs 1120, as shown in FIG. 11, that insert into the holes 1115 to set the length of the flexible band 1610.

As shown, the flexible band 1610 further defines multiple radial openings 1630. The radial openings 1630 open from a radial exterior of the flexible band 1610 to the light sources 210 in the interior of the flexible band 1610. The radial openings 1630 allow light from the light sources 210 to travel radially outward from the flexible band 1610. Using the radial openings 1630 allows the light sources 210 to illuminate the radial exterior of the flexible band 1610. In some cases, illuminating the flexible band 1610 in this way helps make the illumination device 1600 and the user 105 more visible than only illuminating toward the distal end 135. For instance, illuminating the radial exterior of the flexible band 1610 helps make the user 105 visible from multiple directions in low light conditions, when trying to stand out in a crowd, and/or in other environments.

In the illustrated example, the illumination device 1600 further includes a selection switch 1635. The selection switch 1635 typically includes one or more physical switches and/or buttons that allow the user 105 to select different operational modes of the illumination device 1600. As one example, the selection switch 1635 is configured to toggle between a flashlight mode and a laser mode for controlling the light sources 210. As another example, the selection switch 1635 is configured to toggle between a strobe mode and a constant illumination mode for controlling the light sources 210. In yet another example, the selection switch 1635 is configured to switch between different colors of light emitted by the light sources 210. As should be appreciated, the illumination device 1600 is configured to use the selection switch 1635 to select between any combination of operational modes as described herein. In the illustrated example, the electrical port 220, the microphone 320, and the selection switch 1635 are positioned at the distal end 135 on the housing 1605. In an alternate example, the electrical port 220, the microphone 320, and/or the selection switch 1635 are positioned at another portion of the housing 1605, such as on a rear and/or top side.

Figure 24:
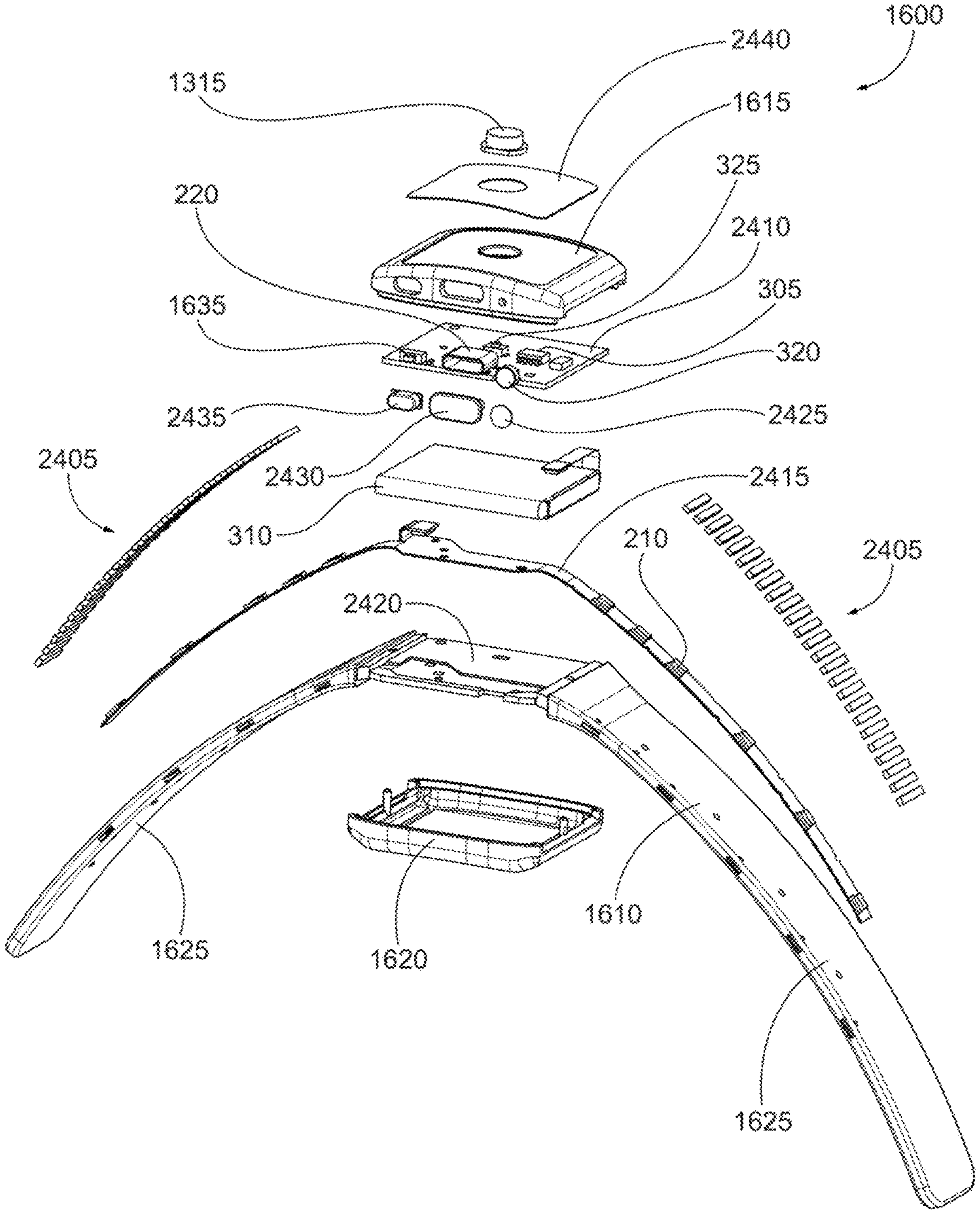
FIG. 24 is an exploded perspective view of the FIG. 16 illumination device.
Figure 25:
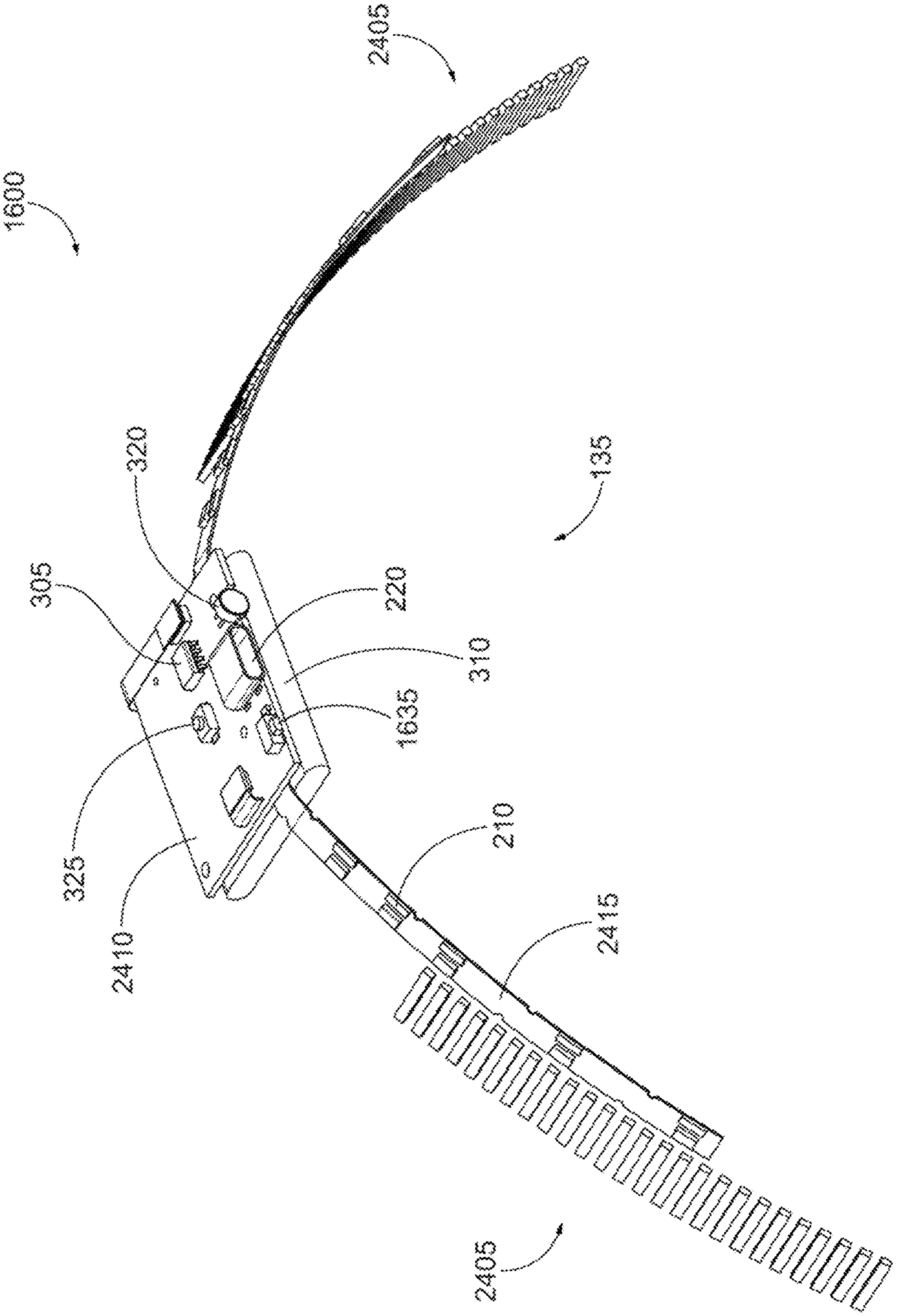
FIG. 25 is a perspective view of internal components used in the FIG. 16 illumination device.

Referring to FIGS. 24 and 25, the illumination device 1600 includes magnets 2405 in one example. The magnets 2405 are typically positioned within the band 205. For instance, the magnets 2405 are embedded within the band 205 and/or positioned within an internal cavity in the band 205. The magnets 2405 are configured to couple the band segments 1625 together on the user 105. In the illustrated example, each of the band segments 1625 includes one or more magnets 2405. In the one form, the magnets 2405 include multiple bar magnets arranged in a series. For instance, the band segments 1625 each include up to 10, up to 20, up to 30, up to 40, and/or another number of the magnets 2405. Alternatively, the magnets 2405 include a flexible strip of magnetic material and/or another type of magnet. As should be appreciated, the illumination device 1600 is configured to utilize a variety of types and arrangements of the magnets 2405 in the flexible band 1610.

As illustrated, the illumination device 1600 includes a first or main board 2410 and a second or band board 2415. The main board 2410 and the band board 2415 are generally similar to the first board 410 and the second board 415 respectively, as shown in FIG. 13. The main board 2410 is generally positioned in the housing 1605. Typically, the main board 2410 is made of a rigid material to provide structural support for various components. In one example, the electrical port 220, the controller 305, the microphone 320, the button 325, the selection switch 1635, and/or other components are mounted on the main board 2410 within the housing 1605. Mounting such components on the main board 2410 provides a fixed structure to ensure reliable electrical connections. Further, such components are generally accessible to the user 105 on the housing 1605. In the FIG. 16 example, the band board 2415 includes a flexible PCB. For example, the band board 2415 is generally a flexible strip that extends along the band 205. The flexible PCB is made of a polymer film and/or another flexible material. The light sources 210 are generally mounted on the band board 2415. Mounting the light sources 210 on the second board 415 allows the light sources 210 to move with the band 205 and wrap around the wrist 125 of the user 105. As should be appreciated, the illumination device 1600 is configured to utilize any arrangement of components.

The band board 2415 generally extends through both the housing 1605 and the flexible band 1610. For example, the band board 2415 is positioned along each of the band segments 1625 and within the housing 1605. In the illustrated example, the band board 2415 is positioned toward the distal end 135 within the flexible band 1610. The band board 2415 generally has a smaller width than the flexible band 1610. The shape and positioning of the band board 2415 allows the magnets 2405 to sit adjacent to the band board 2415 along the flexible band 1610. For example, the magnets 2405 and the band board 2415 are arranged side by side along at least a portion of the flexible band 1610.

The band 205 further includes a support plate 2420. The support plate 2420 is similar to the support plate 1305 in FIG. 13. In one example, the support plate 2420 is integrally formed with the band segments 1625 to form the flexible band 1610. For instance, the support plate 2420 and the band segments 1625 are formed from a single continuous piece of material and/or the band segments 1625 are fused to the support plate 2420. The support plate 2420 is typically positioned in the housing 1605. In one example, the support plate 2420 is rigid to provide structural support for the main board 2410 and/or the band board 2415. Further, the support plate 2420 helps couple the flexible band 1610 to the housing 1605. For instance, support plate 2420 is configured to couple to the housing 1605 through one or more fasteners, by snapping in place, and/or in another way. In another example, the first cover 1615 and the second cover 1620 attach to the flexible band 1610 by clamping onto the support plate 2420. As should be appreciated, the band 205 is configured to utilize a variety of different constructions and/or to couple to the housing 1605 in a variety of ways.

As noted, the controller 305 is typically mounted to the main board 2410 within the housing 1605. In one version, the controller 305 includes an integrated circuit (IC). In some cases, the IC in the controller 305 includes a microcontroller rather than a more complex processor or microprocessor. Such processors typically include multiple cores, such as central processing units (CPUs), graphics processing units (GPUs), and/or other components. The transistor count in such processors is typically in a range of hundreds of millions to over one billion. Further, such processors are typically configured to run an operating system and/or a variety of types of applications. However, the illumination device 1600 is typically configured to utilize a relatively simple controller 305 that is configured to perform one or more particular functions. In one example, the controller 305 includes a microcontroller having a single core, such as a 32-bit core and/or another simple core. As another example, the controller 305 includes a microcontroller having a transistor count in a range of hundreds of thousands to a few million. Alternatively, in some cases, the IC includes a relatively simple circuit rather than a processor or other more complex type of IC. As some examples, the controller 305 includes a decoder, encoder, Analog-to-Digital Converter (ADC), Digital-to-Analog Converter (DAC), Static Random-Access Memory (SRAM) chip, Electrically Erasable Programmable Read-Only Memory (EEPROM) chip, amplifier, and/or another simple integrated circuit configured for a particular task. Using such a relatively simple IC and/or microcontroller in the controller 305 generally reduces potential points of failure and helps ensure reliable operation. For instance, in some cases, the controller 305 is less likely to fail than a more complex processor having many more components and/or running software such as an operating system and/or applications. Further, using such simple microcontrollers and/or ICs allows the illumination device 1600 to utilize relatively low amounts of power and support a long use time on a single charge.

The illumination device 1600 further includes the button cap 1315, a membrane 2425, an electrical port cover 2430, and a switch cap 2435. The button cap 1315 on the illumination device 1600 is generally the same as the button cap 1315 on the illumination device 1100 in FIG. 13. The switch cap 2435 is coupled to and/or is part of the selection switch 1635. The switch cap 2435 generally provides a large and/or easily accessible area for the user 105 to interact with the selection switch 1635. The membrane 2425 is generally positioned over the microphone 320. The membrane 2425 is configured to dampen sound impulses to protect the microphone 320. Finally, the electrical port cover 2430 is configured to attach to and protect the electrical port 220 when not in use. The electrical port cover 2430 is removable to allow the ESS 310 to be recharged and otherwise helps to prevent dust and/or moisture from entering the electrical port 220.

In one example, the illumination device 1600 further includes a cover 2440. The cover 2440 is positioned on a top side of the housing 1605. The cover 2440 typically has an image, a logo, and/or other information displayed. For instance, the cover 2440 in one version includes a decal that identifies the product and/or instructions on how to use the illumination device 1600. In other versions, the cover 2440 includes a brand, an advertisement, a sponsorship notice, and/or other commercial communication. For example, at least some sponsorship or advertising money from an organization hosting and/or sponsoring an event or other experience, like a concert, sporting event, a theme park experience, and the like, can be used to offset the cost of the illumination device 1600 so that the illumination device 1600 can be provided for free or at a reduced cost. Alternatively or additionally, the cover 2440 provides protection from scratches and/or other damage on the housing 1605.

Figure 26:
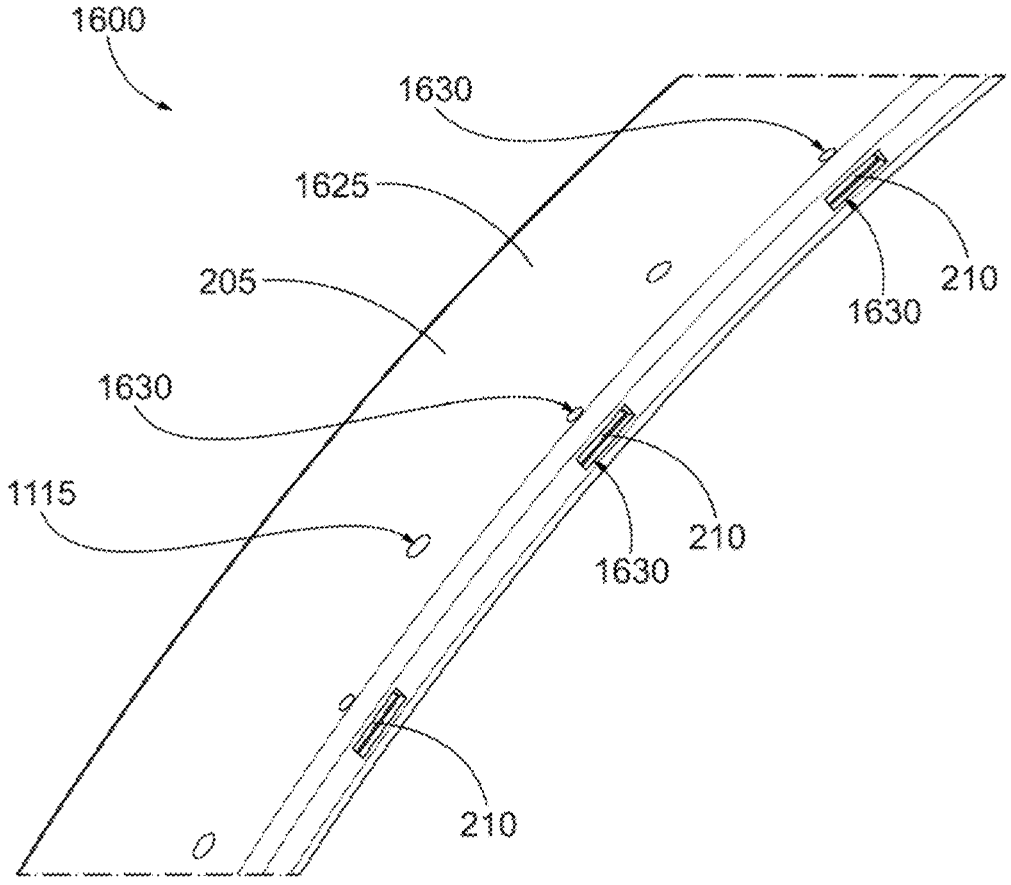
FIG. 26 is an enlarged view of the FIG. 16 illumination device.
Figure 27:
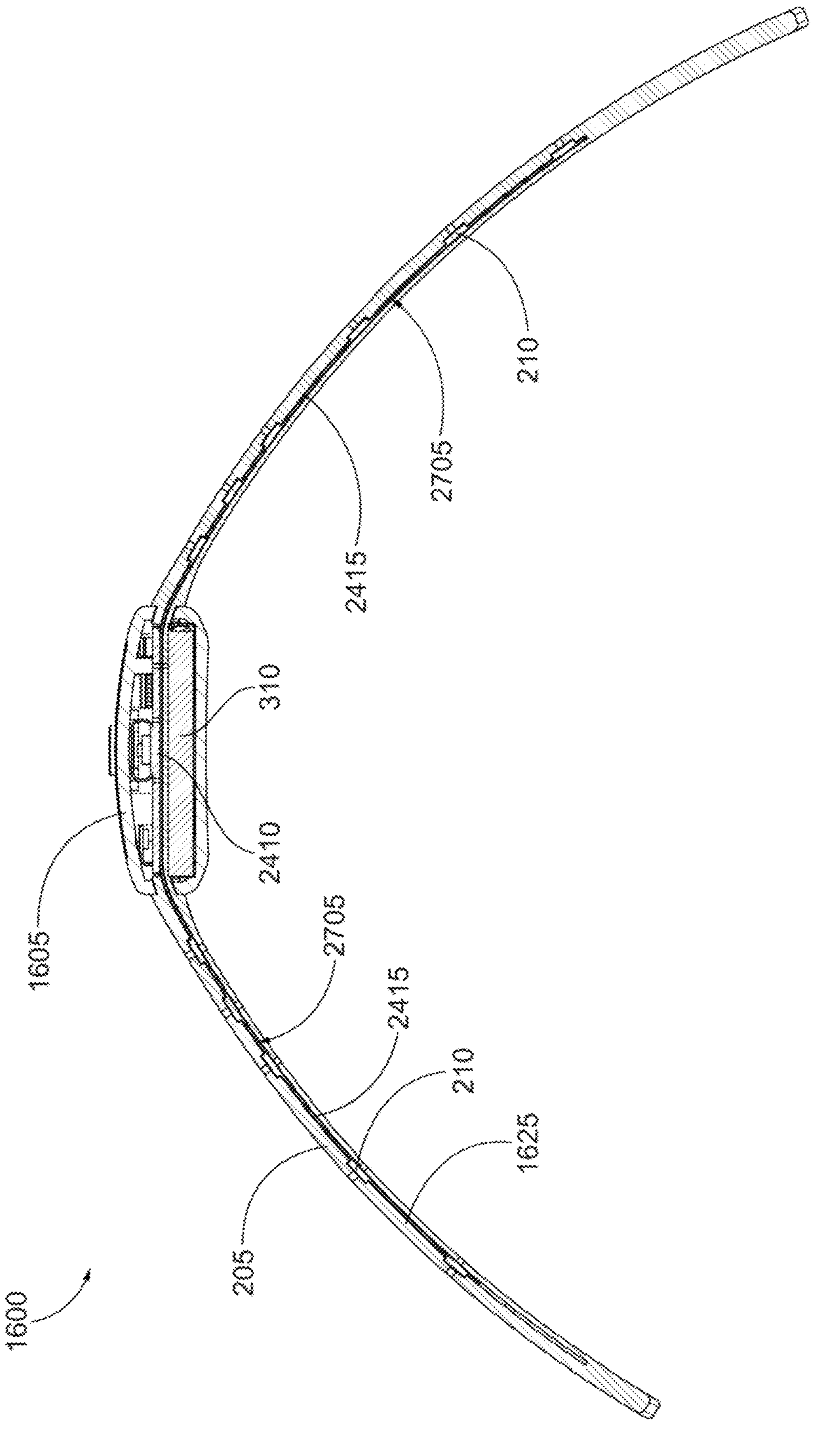
FIG. 27 is a cross-sectional view of the FIG. 16 illumination device as taken along line 27-27 in FIG. 22.
Figure 28:
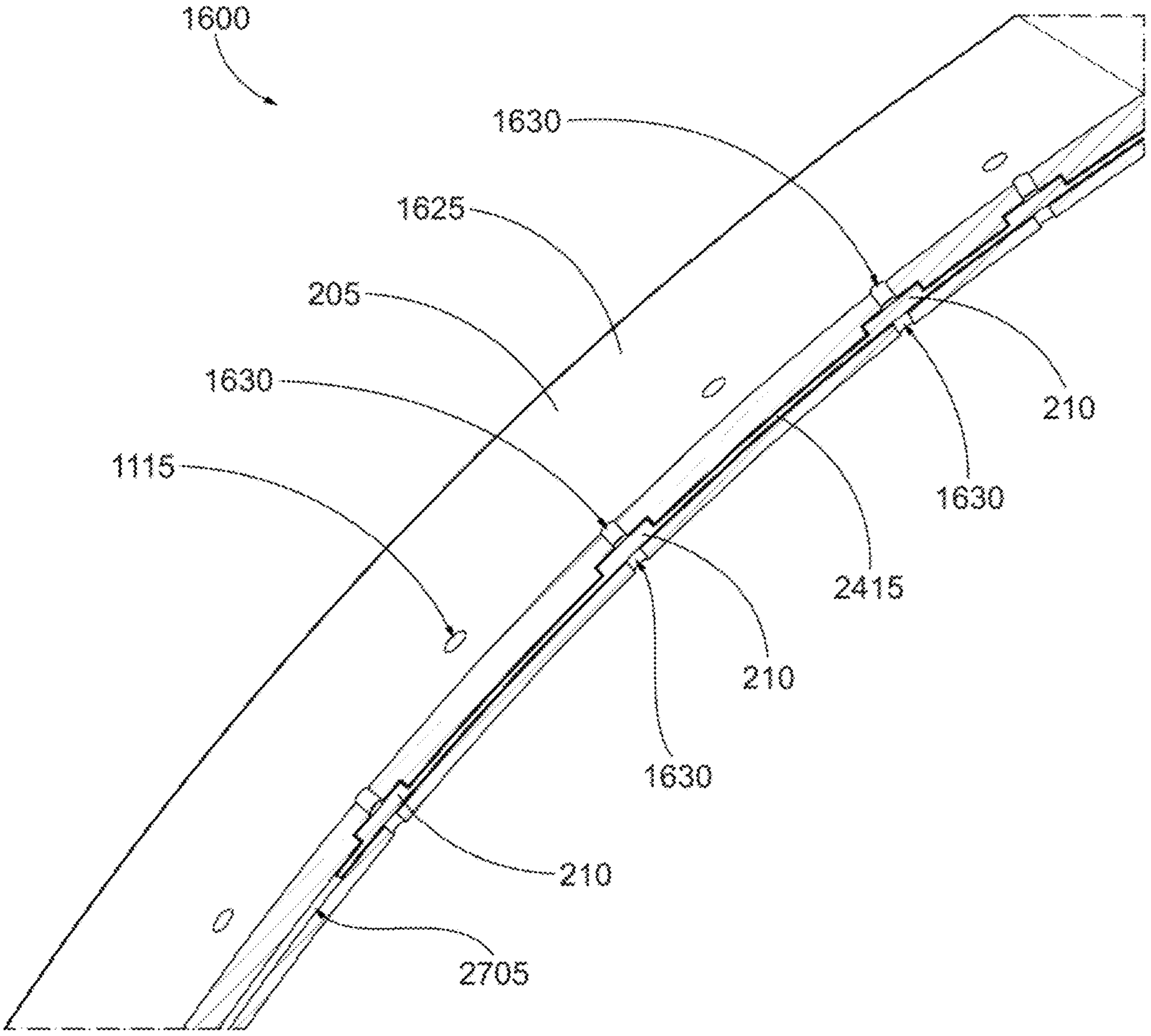
FIG. 28 is an enlarged cross-sectional view of the FIG. 16 illumination device.

Referring to FIGS. 26, 27, and 28, the light sources 210 are generally nested within the band 205. For example, the light sources 210 are fully contained within the band 205. The light sources 210 are configured to emit light outside the band 205 through the slots 1110 and/or the radial openings 1630. As illustrated, the radial openings 1630 are typically positioned on a radial exterior of the band 205. In the FIG. 28 example, the radial openings 1630 extend fully through the band 205. In that example, the radial openings 1630 open from the interior of the band 205 at the light sources 210 to both a radially inward and a radially outward exterior on the band 205.

The band 205 further defines a channel 2705. The channel 2705 provides space for the band board 2415 and/or the light sources 210 within the band 205. In one example, the band 205 is formed with the channel 2705 before assembly of the illumination device 1600. In that example, the band board 2415 and/or the light sources 210 are inserted into the channel 2705 on the band 205. In another example, the band 205 is formed by molding and/or pressing the band 205 around the band board 2415 and the light sources 210. Further, the magnets 2405 are incorporated into the band 205 in the same or similar way as the band board 2415 and the light sources 210. As should be appreciated, the band 205 is able to be formed through a variety of techniques.

FIGS. 29, 30, 31, and 32 depict an illumination device 2900 according to a further example. The illumination device 2900 is constructed in the same fashion as the illumination device 1600 in FIG. 16 with a few notable exceptions discussed below. For example, the illumination device 2900 includes the housing 1605 with the button 325 and the flexible band 1610 with the light sources 210 that shine through corresponding edge slots 1110 in the band segments 1625. Like in the FIG. 16 illumination device 1600, the band segments 1625 in the FIG. 29 illumination device 2900 have magnets 2405 for securing the band segments 1625 together. The illumination device 2900 in FIG. 29 generally operates in the same manner as the illumination device 1600 in FIG. 16. For the sake of brevity as well as clarity, the common features will not be again described in great detail, but please refer to the previous discussion of the FIG. 16 illumination device 1600.

Instead using the electrical port 220 to recharge the ESS 310 (e.g., a battery), the illumination device 2900 includes a wireless power transfer system (WPT system) 2905 to wirelessly recharge the ESS 310. As shown, the wireless power transfer system 2905 includes a power transmitter 2910 that wirelessly transfers electric power to a power receiver 2915 in the housing 1605 of the illumination device 2900. In one version, the wireless power transfer system 2905 uses a wireless induction technique for recharging. The power transmitter 2910 in this version includes a transmitter coil, and the power receiver 2915 includes a receiver or induction coil. The light sources 210 in the illumination device 2900 in one form display one or more colors and/or light patterns that indicate the charge state of the illumination device 2900 during wireless charging. For example, one or more of the light sources 210 can blink a red light during charging and change to a solid green light when the illumination device 2900 is fully charged. The light sources 210 can emit other light patterns and/or colors in other examples.

Figure 29:
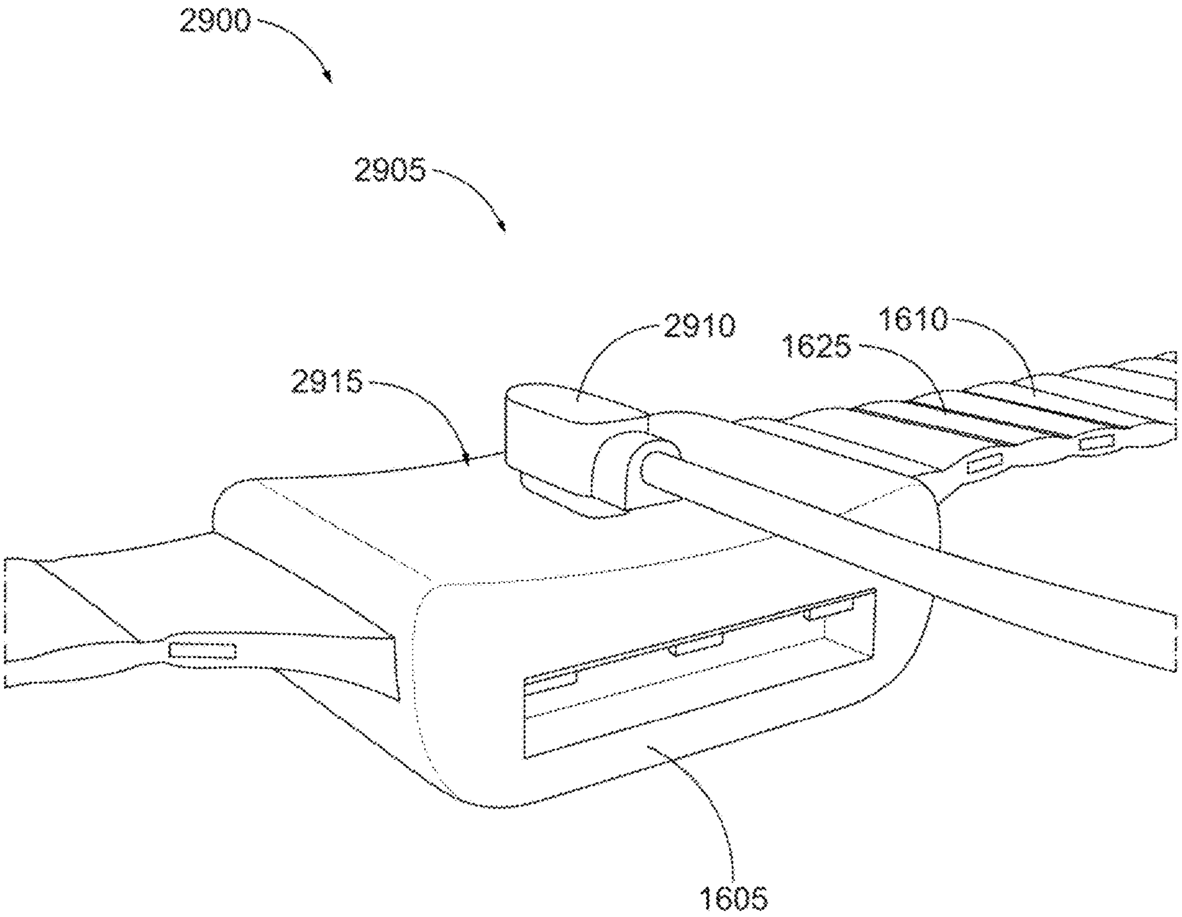
FIG. 29 is an enlarged perspective view of an illumination device with a wireless power transfer system according to still yet another example.
Figure 30:
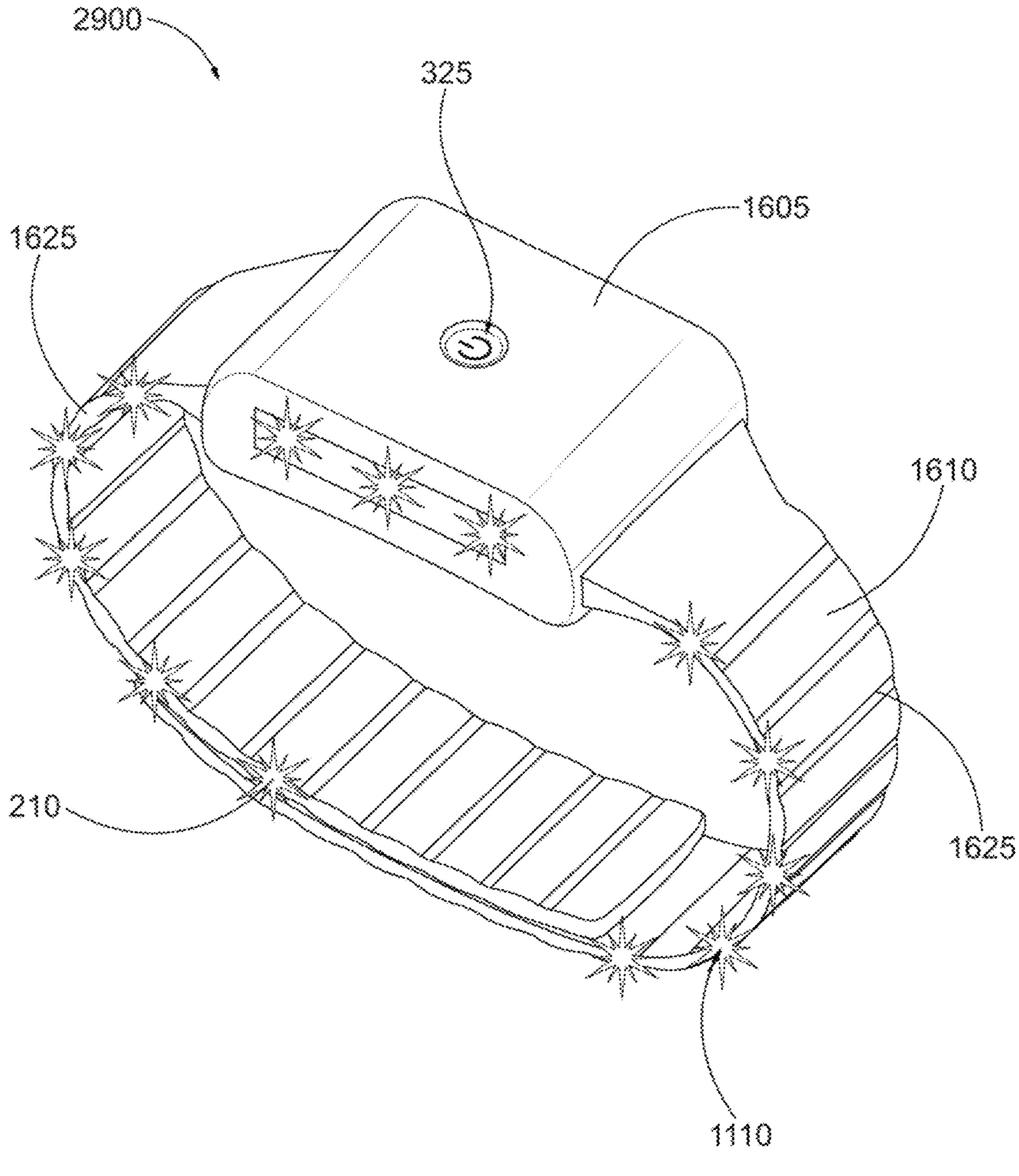
FIG. 30 is a top perspective view of the FIG. 29 illumination device.
Figure 31:
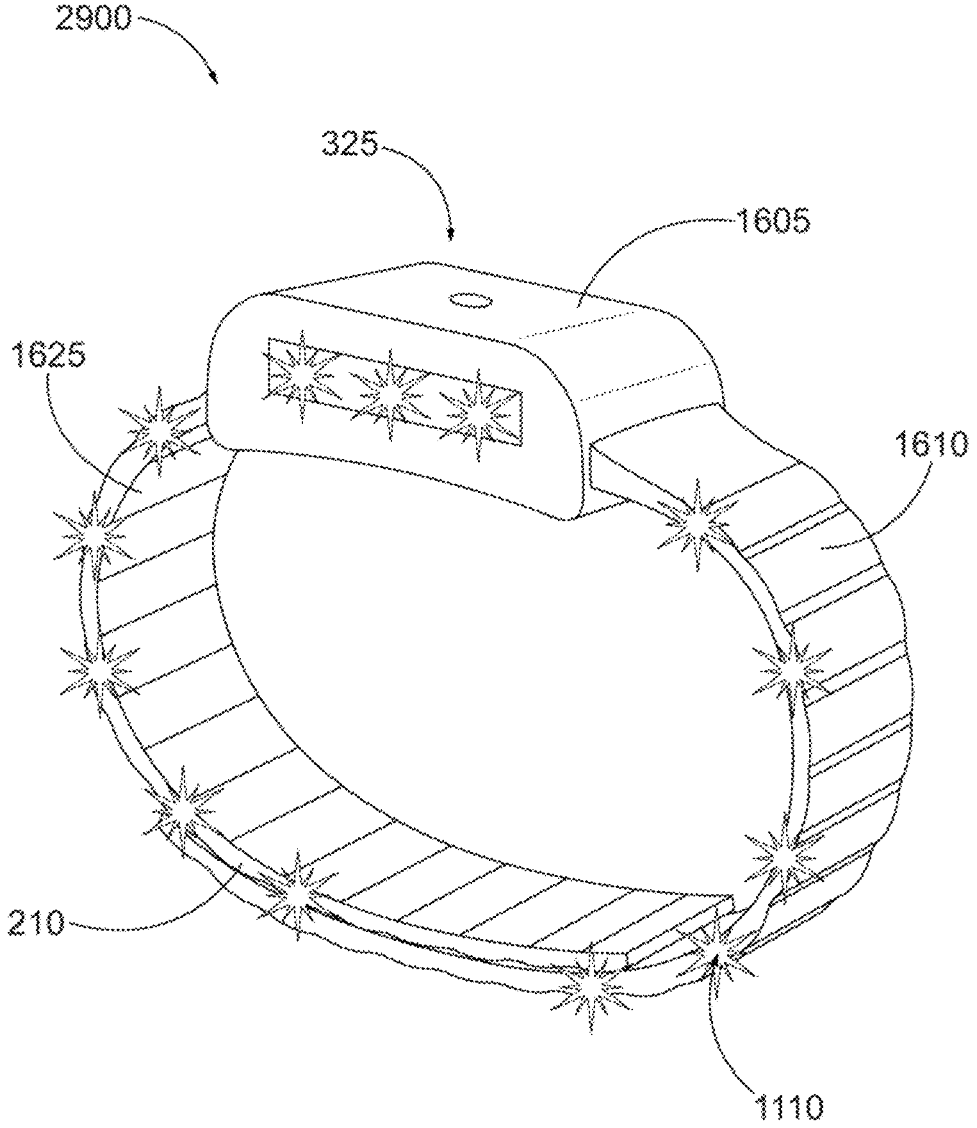
FIG. 31 is a side perspective view of the FIG. 29 illumination device.
Figure 32:
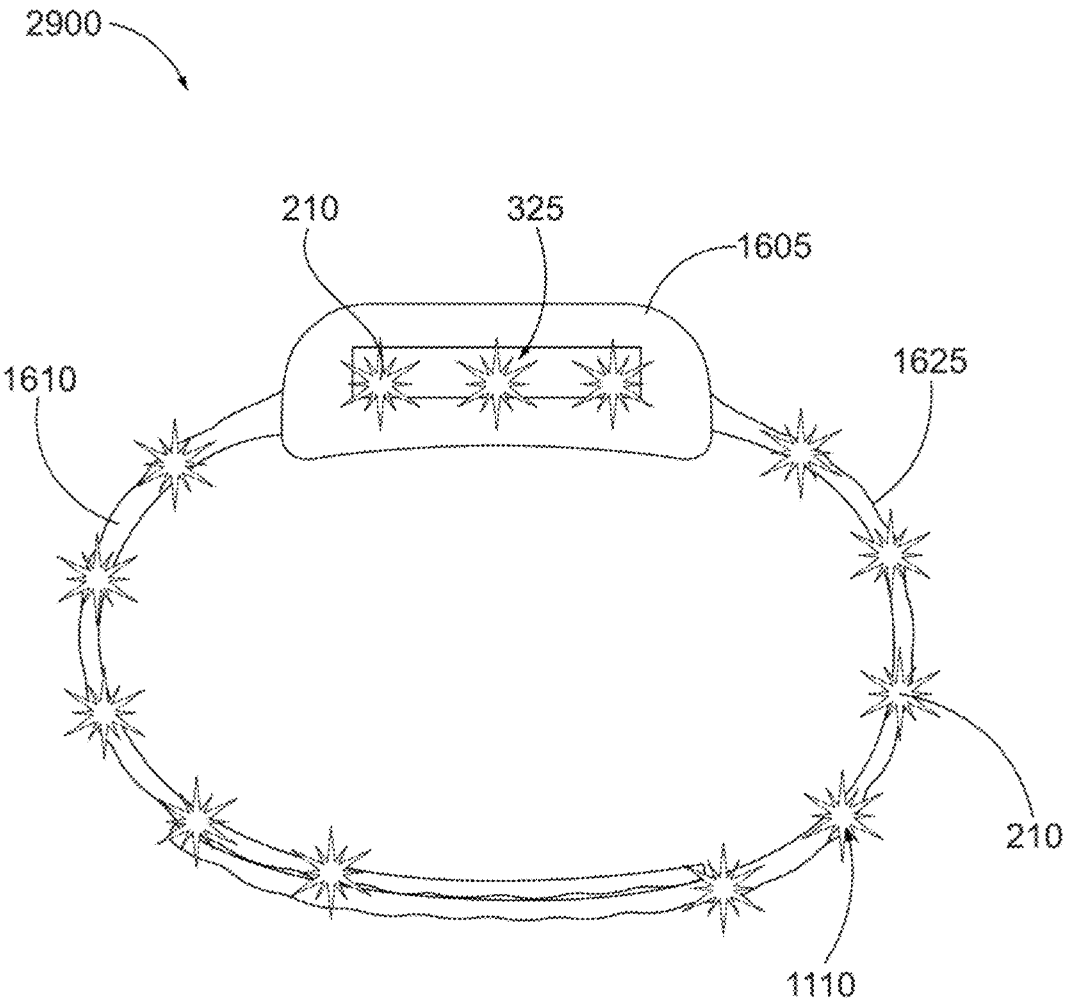
FIG. 32 is a front view of the FIG. 29 illumination device.

As shown in FIGS. 30, 31, and 32, the flexible bands 1610 have the light sources 210 where the light sources 210 emit light. However, the flexible band 1610 in the illumination device 2900 in FIG. 29 lack the radial openings 1630. It should be recognized that the flexible bands 1610 for the FIG. 29 illumination device 2900 in other variations can have the radial openings 1630.

Figure 16:
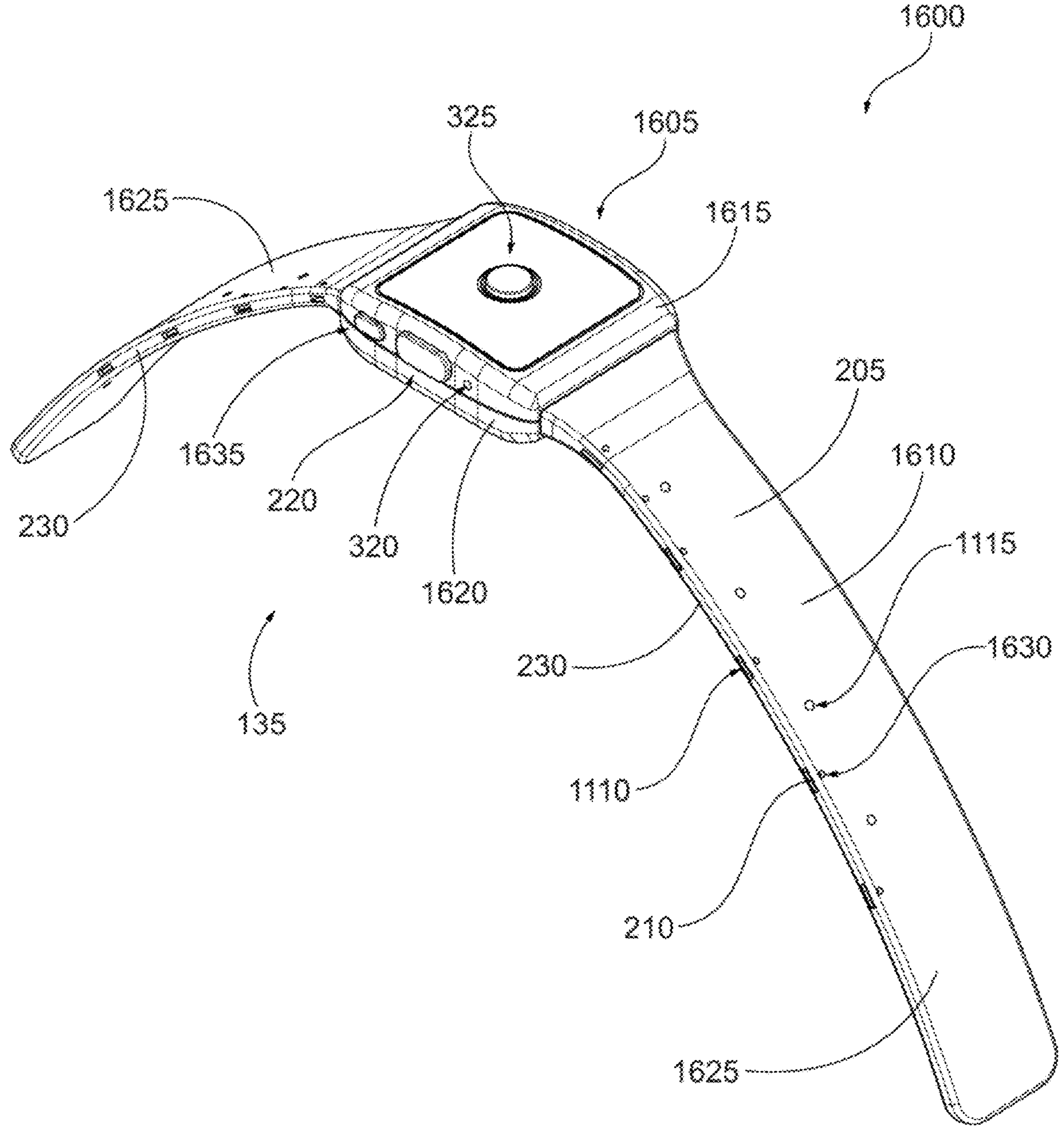
FIG. 16 is a front perspective view of an illumination device according to a further example.
Figure 17:
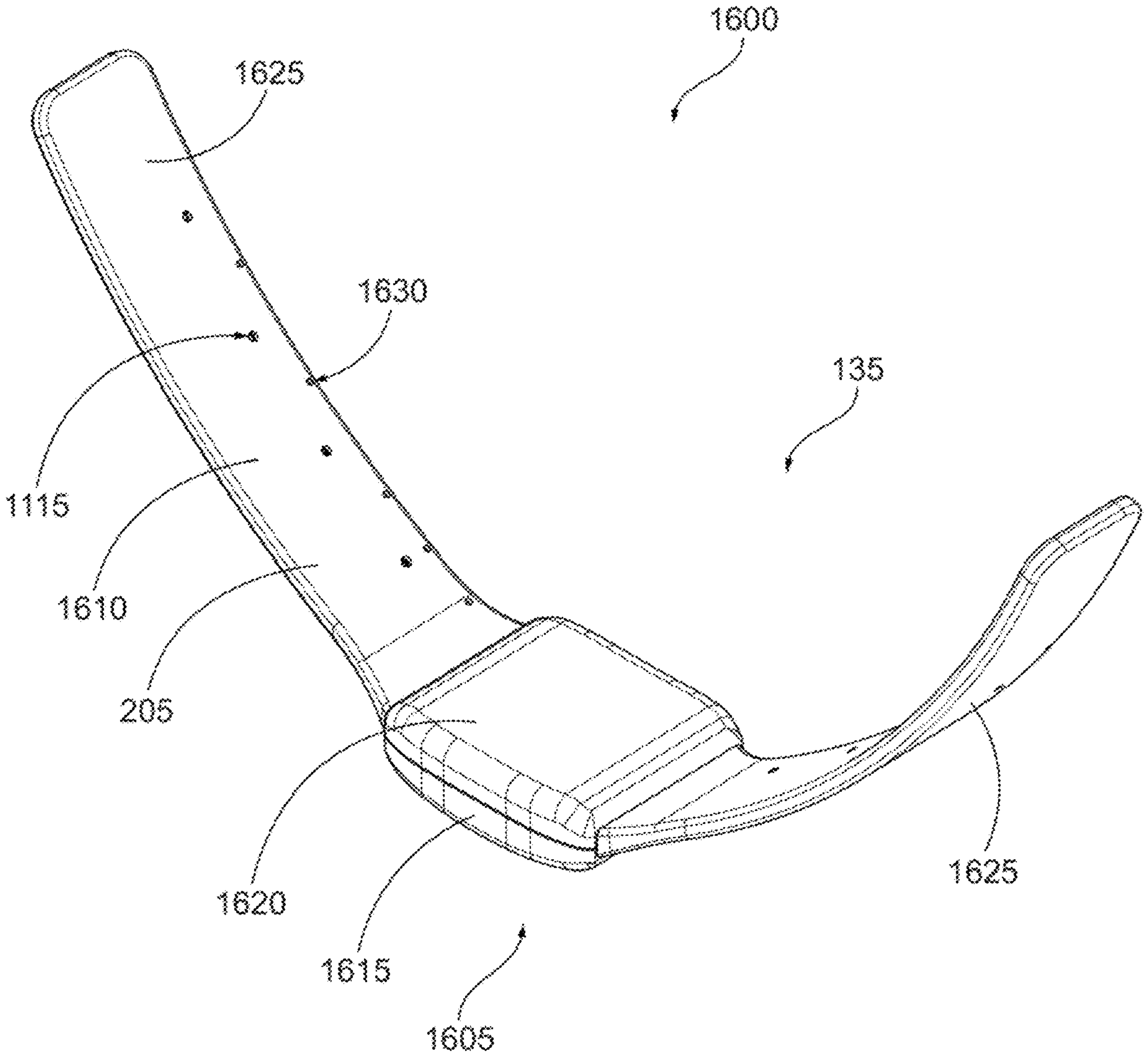
FIG. 17 is a rear perspective view of the FIG. 16 illumination device.
Figure 18:
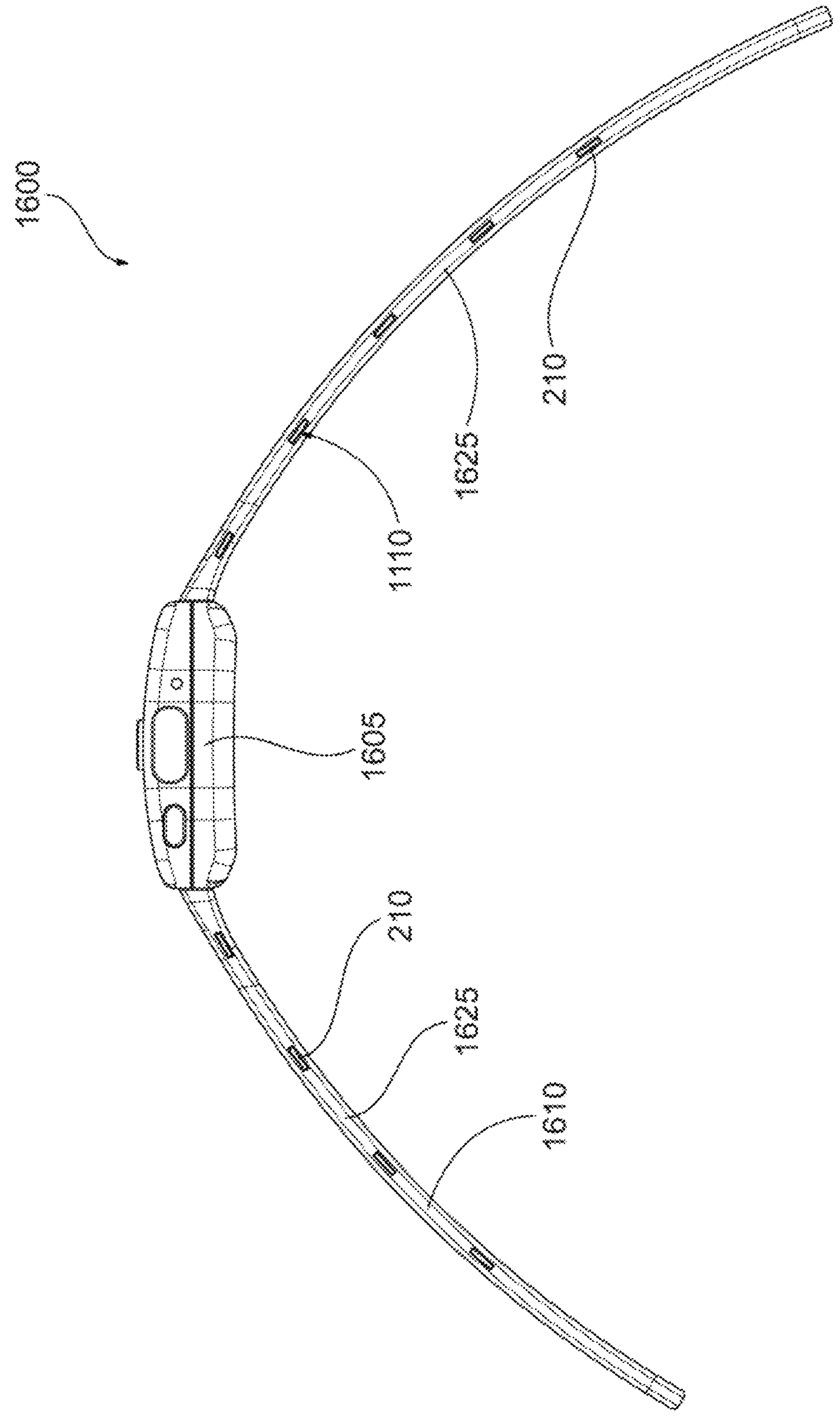
FIG. 18 is a front view of the FIG. 16 illumination device.
Figure 19:
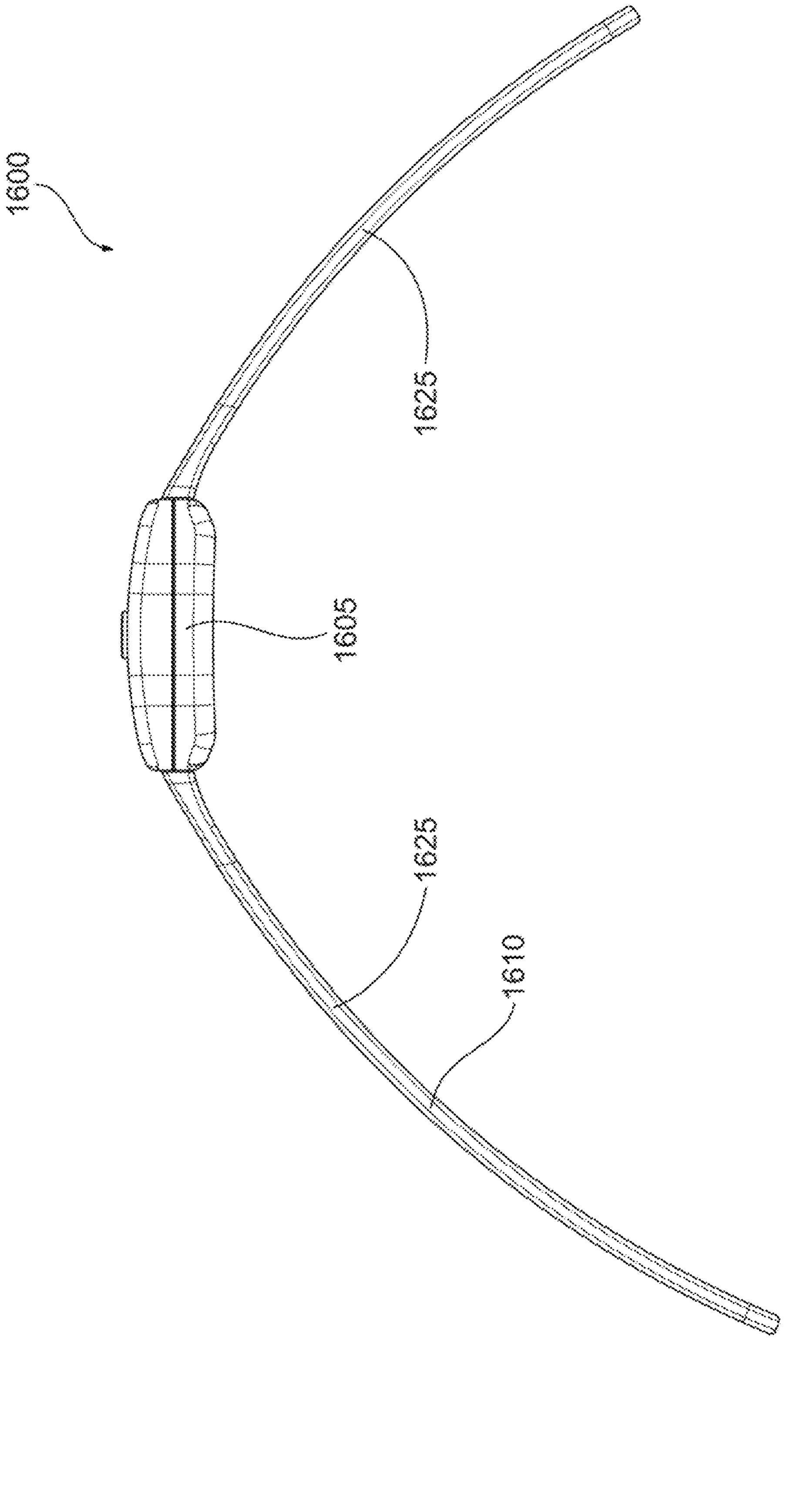
FIG. 19 is a rear view of the FIG. 16 illumination device.
Figure 20:
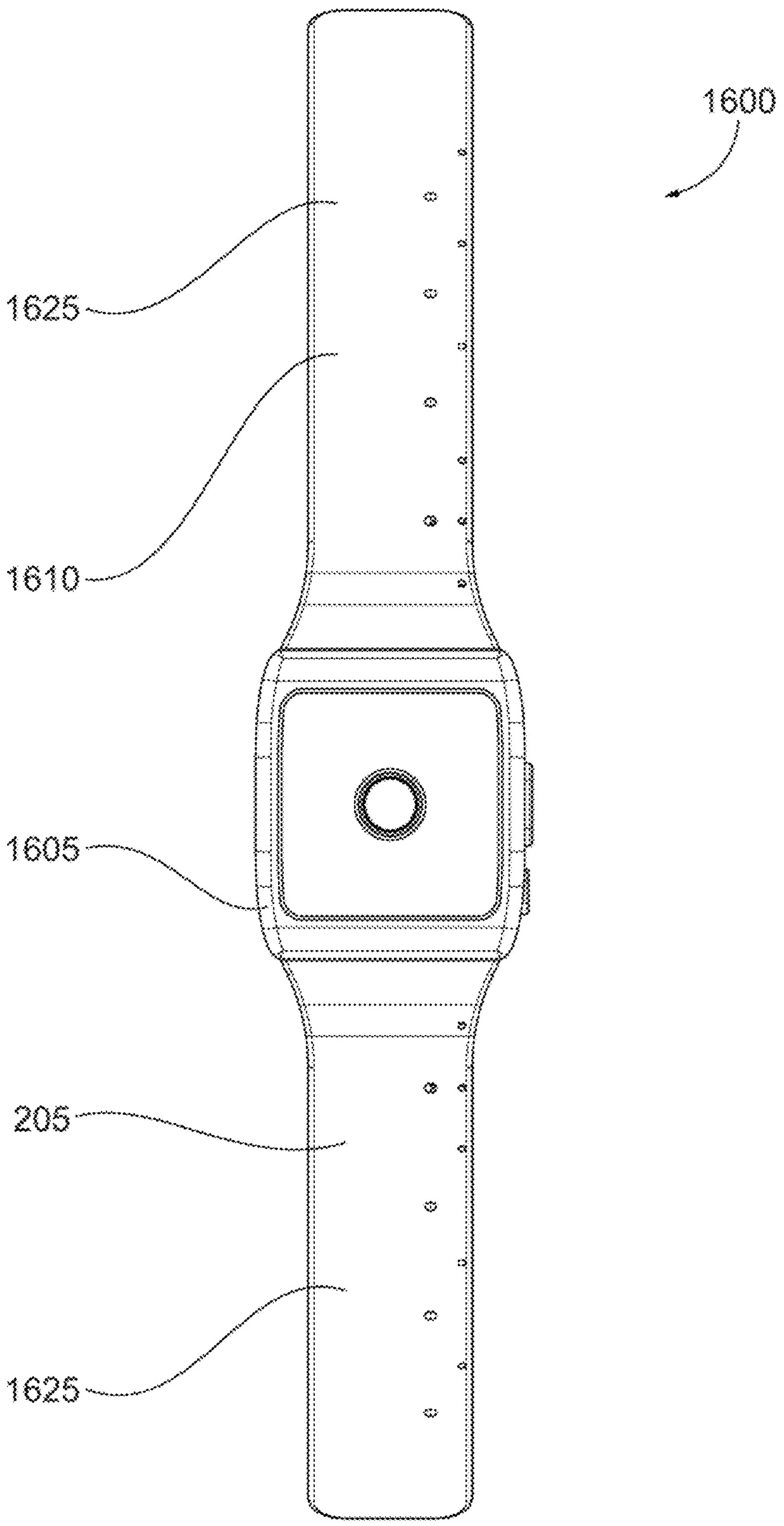
FIG. 20 is a top view of the FIG. 16 illumination device.
Figure 21:
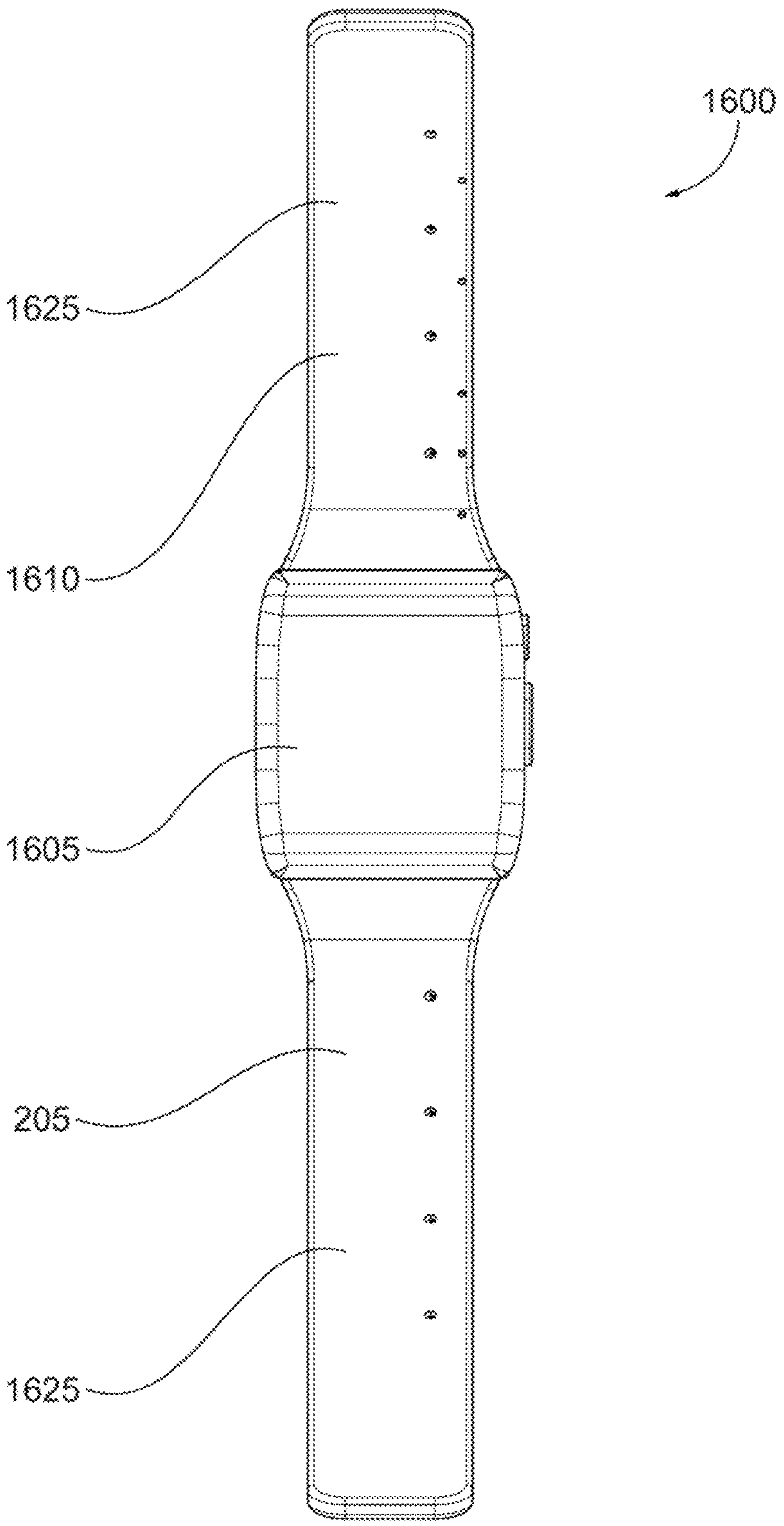
FIG. 21 is a bottom view of the FIG. 16 illumination device.
Figure 22:
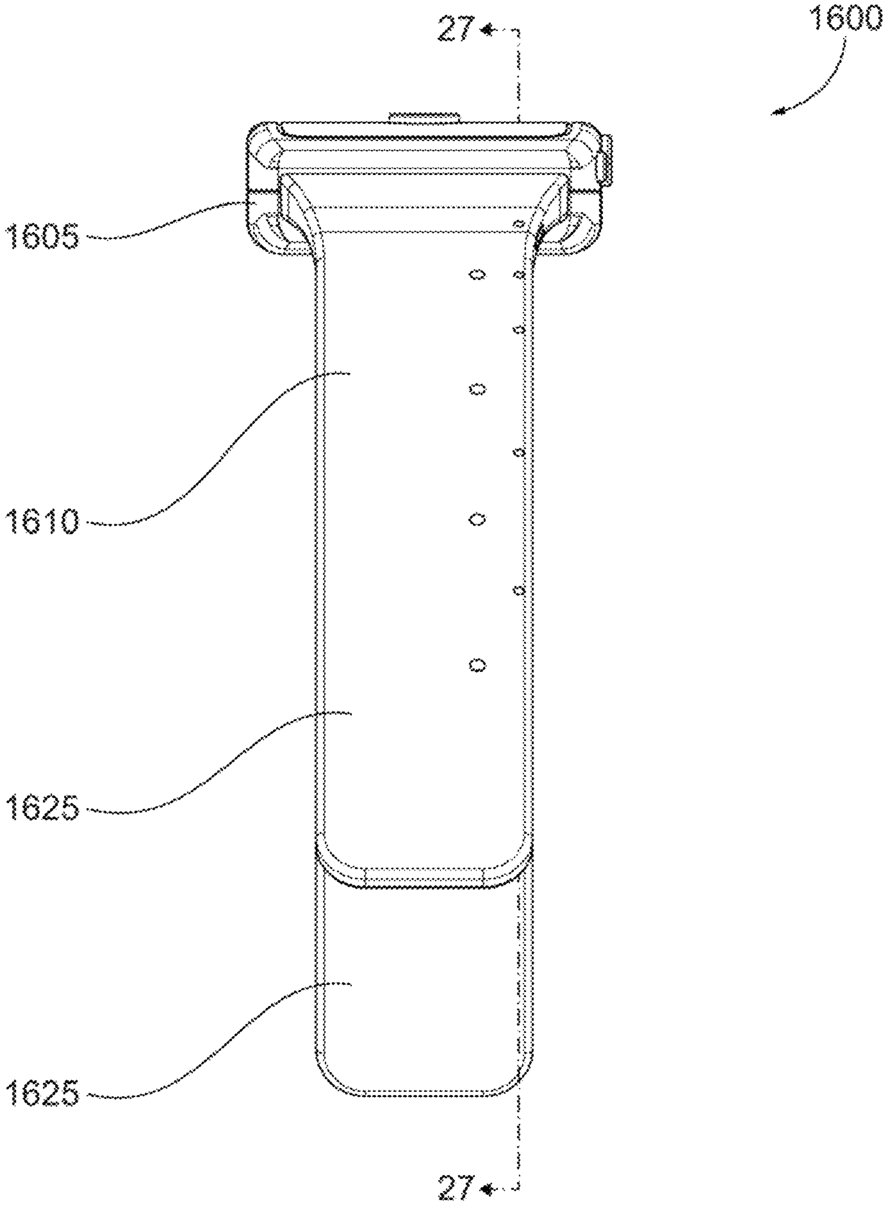
FIG. 22 is a first side view of the FIG. 16 illumination device.
Figure 23:
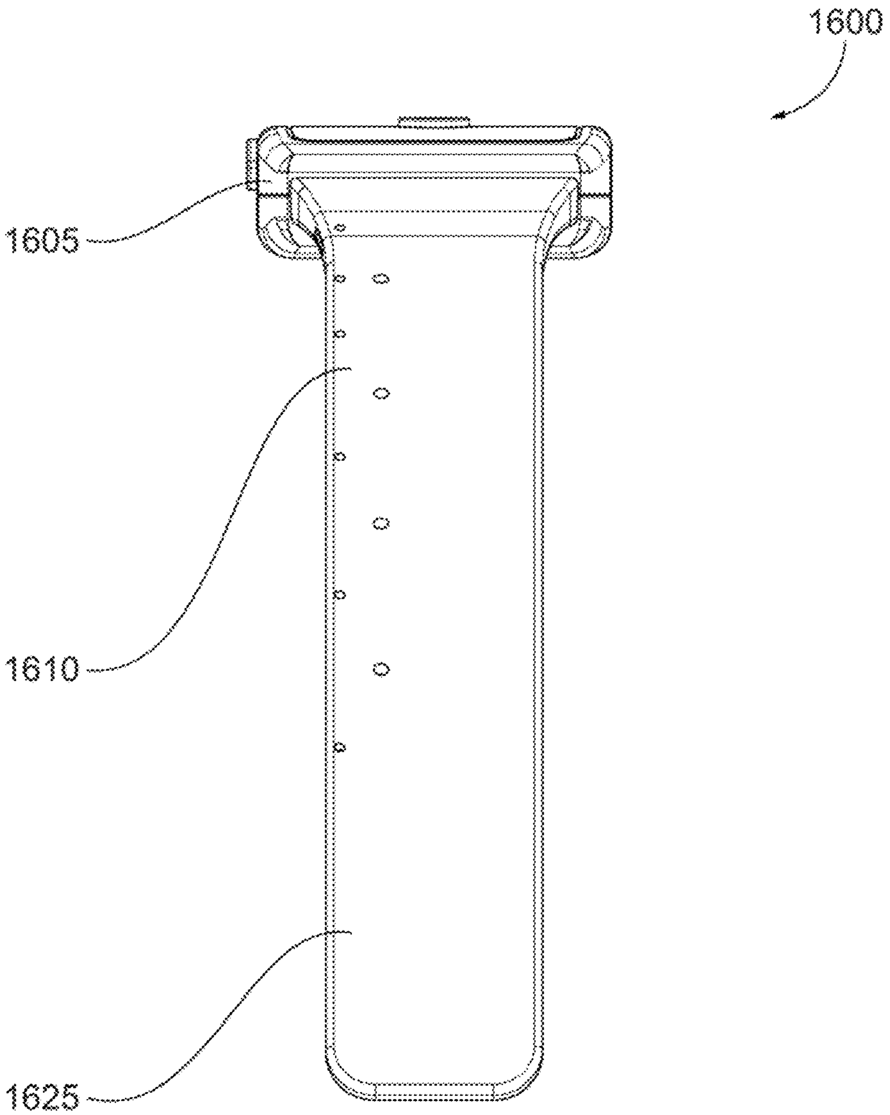
FIG. 23 is a second side view of the FIG. 16 illumination device.

The illumination device 100 is generally configured to utilize any combination of features as described for the FIG. 11 illumination device 1100, the FIG. 14 illumination device 1400, the FIG. 16 illumination device 1600, the FIG. 29 illumination device 2900, and/or any other examples of the illumination device 100. In various examples, particular combinations of features are used for certain use cases and/or preferences of the user 105. The following combination examples are meant to be illustrative and in no way limit the available combinations of features used in the illumination device 100.

In one version, the illumination device 100 is generally adapted for basic everyday use and/or for everyday outdoor activities, such as walking, biking, and/or running. The band 205 is made of flexible silicone, such as the flexible band 1105 shown in FIG. 11 and/or the flexible band 1610 shown in FIG. 16 or 29. The housing 405 is splash resistant to protect the internal components from moisture in the environment. The light sources 210 are configured to operate in a relatively limited way. For instance, the light sources 210 include white LEDs and/or another single color of LED. The illumination device 100 is configured to utilize a handful of operational modes, including a high intensity light mode, a low intensity light mode, and a strobe light mode. The inputs to control the light modes are received through presses of the button 325. Further, the ESS 310 includes disposable coin cell batteries. Such an example of the illumination device 100 utilizes a relatively basic construction and provides functionality for casual use of the illumination device 100.

In another version, the illumination device 100 has a relatively robust construction and is made of durable and/or stylish materials. The housing 405 is made of metal and/or includes a metal bezel. The band 205 is made of a high quality material. In some versions, the band 205 includes the links 215 made of metal. In one example, the band 205 is compatible with other types of smart watches and/or other wearable accessories. In one version, only the bands 205 are used as replacement or after market bands for smart watches, and in that version, the bands 205 replace the original equipment manufacturer (OEM) bands for smart watches, such as those sold by APPLE®, SAMSUNG®, GOOGLE®, GARMIN®, and the like. The bands 205 can be paired or placed in other operative communication with the smart watch so as to provide further functionality. For example, the bands 205 can light in different patterns, colors, and/or rates depending the caller identification for a phone call or text message as well as the sender of an email or direct message. As another example, the bands 205 can light in different patterns, colors, and/or rates depending on various health statistics, like pulse, blood pressure, breathing, blood glucose levels, and the like sensed by the smart watch, a paired smartphone, sensor, or a medical device. For example, the bands 205 can blink a red color when a dangerous health condition is detected, like an irregular heart rate, high blood pressure, and low blood glucose levels.

The illumination device 100 is configured to operate through a wide range of modes. For example, the illumination device 100 includes a brightness governor, such as in the controller 305, that is configured to vary the brightness of the light sources 210 across multiple levels. Such an example of the illumination device 100 utilizes a high quality construction for the users 105 that desire both functionality and style. Further, the ESS 310 is rechargeable in most cases (but not necessarily in all cases). In one example, the ESS 310 includes a lithium-polymer (LiPo) battery that stores up to 300 milliamp-hours of energy. The illumination device 100 includes the electrical port 220 to support charging of the ESS 310.

In yet another version, the illumination device 100 is adapted for use at concerts, festivals, performances, clubs, and/or other similar settings. The illumination device 100 is configured to operate the light sources 210 based on music and/or other sounds. The microphone 320 is configured to pick up music to allow the illumination device 100 to synchronize to the music. In one example, the microphone 320 is a micro-electro-mechanical system (MEMS) that fits on a miniature integrated circuit. The microphone 320 typically has a high acoustic overload point (AOP) to allow the microphone 320 to respond to loud sounds accurately. For example, the microphone 320 is configured to record sounds up to a range of 115 to 120 Decibel Sound Pressure Level (dB SPL). The illumination device 100 includes a port with an expanded foam mesh to allow sound to travel to the microphone 320. Further, the illumination device 100 includes an automatic gain control (AGC) and/or an audio limiter to allow the controller 305 to process sounds in a wide range of volumes. The controller 305 is configured to operate the light sources 210 in a variety of patterns and/or colors in response to the ambient music. For example, light sources 210 include multi-color LEDs, such as red, green, and blue (RGB) LEDs, configured to illuminate in multiple colors. The controller 305 is further configured to operate with low latency, such as below 30 milliseconds, to maintain synchronization with the music. In this example, the ESS 310 is rechargeable and the band 205 includes a flexible silicone band.

In a further version, the illumination device 100 is adapted for various outdoor nighttime, lowlight, and/or stealth activities, such as hunting, camping, and/or stargazing as examples. The light sources 210 are configured to illuminate with red light, such as light with a wavelength in a range of 620 nanometers to 650 nanometers. The red light is generally optimal for illuminating maps and/or the surrounding area without disrupting natural night vision. In one example, the illumination device 100 includes a detachable diffusion cap that disperses light for reading a map. Further, the light sources 210 are configured to illuminate with a relatively low intensity. The illumination device 100 provides one or more additional modes for a low intensity glow and/or for silent operation. In one example, pressing the button 325 and/or sliding the selection switch 1635 switches to a silent mode and/or a completely dark mode. The ESS 310 is rechargeable and provides a long runtime for the illumination device 100. The overall power consumption of the illumination device 100 is typically low in this example. The illumination device 100 has a robust construction. For example, the band 205 includes a rugged silicone band that is highly durable.

The illumination device 100 is still yet other versions is used as a light source in manufacturing, construction, repair, warehousing, and other commercial settings. For instance, illumination device 100 can provide a convenient lighting source for automotive repair and for construction. With the illumination device 100 being worn on the wrist, the light from the illumination device 100 is generally directed to a particular repair area or other area of interest. The lighting provided by the illumination device 100 can also be used by first responders, law enforcement, and utility workers when in low light conditions.

In another version, the illumination device 100 is adapted for children to play, such as when dancing and/or at a party. The light sources 210 are configured to illuminate in one or more beams, similar to a laser. The intensity of the beams from the light sources 210 is substantially less than that of a laser to ensure that the light beams are safe for play. The controller 305 is configured to operate the light sources 210 in a variety of colors and patterns. Pressing the button 325 and/or sliding the selection switch 1635 allows the user 105 to cycle through various modes, such as different color and/or pattern combinations. The illumination device 100 utilizes a relatively simple construction. For example, the band 205 includes a small flexible band. Further, the ESS 310 includes disposable coin cell batteries. Such an example of the illumination device 100 utilizes a relatively basic design with an emphasis on fun colors and patterns for kids.

In yet a further version, a kit of at least two illumination devices 100 are configured to pair together. The illumination devices 100 in the pair are adapted for use in a group, such as multiple kids, family members, and/or individuals in a cooperative and/or role-play setting. The illumination devices 100 are configured to pair together through a device handshake. The handshake is initiated by the users 105 through one or more physical gestures, such as tapping the illumination devices 100 together. The handshake utilizes Bluetooth® and/or other types of short-range wireless communication protocols between the illumination devices 100. In one example, the illumination devices 100 include magnets that allow the illumination devices 100 to snap together. The illumination device 100 includes a speaker that produces one or more sound effects, such as when the user 105 moves in a certain way and/or when multiple users 105 pair together. When paired, the users 105 are configured to operate in a synchronized and/or an interactive way. The illumination devices 100 are configured to operate the light sources 210 in a variety of ways. In one example, the light sources 210 are configured to illuminate using a beam arrangement similar to a laser. The illumination devices 100 generally utilize a relatively simple construction, such as with small flexible bands and disposable coin cell batteries.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"Accelerometer" generally refers to a device or instrument that measures acceleration or the rate of change of velocity. In one form, the accelerometer measures proper acceleration in which the acceleration of a body is relative to the instantaneous rest frame of the body. The accelerometer can include single-axis or multi-axis type accelerometers. By way of non-limiting examples, the accelerometer can include capacitive, resistive, servo, laser, magnetic induction, optical, piezoelectric, resonance, and quantum type accelerometers, just to name a few.

"Adhesive" or "Glue" generally refers to any non-metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Appendage" generally refers to a part that is attached to a main body of a human or animal, often with a specific function. Some examples of appendages include limbs (like arms and legs), a tail, fins, or antennae.

"Axis" generally refers to a straight line about which a body, object, and/or a geometric figure rotates or may be conceived to rotate.

"Band" generally refers to a strip of material used to encircle an object and/or to bind one or more items together. In some cases, the band includes to a strip serving to join or hold things together. In the context of timepieces, jewelry, or other items worn by an individual, a band is the component that secures a watch case or other item to appendage of an individual. For instance the band can be used to secure a watch case to a wrist of the individual. Industry usually categorizes these attachments into two general categories, flexible straps and metal bracelets. Straps are typically made from materials like leather, silicone, and/or woven nylon, such as the military-inspired NATO style. Bracelets commonly include individual links, such as those made from metal, plastic, and/or rubber. Some common bands types include a three-link Oyster, a five-link Jubilee, or a woven Milanese mesh type design. To stay secure, the band commonly uses a fastening mechanism, such as a traditional tang buckle or a folding deployment clasp. Each component works together to ensure the timepiece or other item remains centered on the wrist or other appendage during movement In other examples, the band includes a physical loop, like a rubber band, for organization or metal wedding bands worn on a finger. Still further examples of these binding tools include industrial steel bands used to bundle cargo or elastic ties used to hold hair in place.

"Battery" generally refers to a device that converts chemical energy into electrical energy. The battery stores energy in chemical form and then discharges the energy by converting chemical energy into electricity. The battery generally includes one or more electrochemical cells and terminals. The terminals usually include an anode and a cathode.

"Circuit Board" or "Board" generally refers to a piece of hardware that contains an electrical circuit assembly. The circuit assembly may include one or more electrical or electromechanical circuit components including capacitors, inductors, semiconductors, switches, resistors, and programmable devices. The board may contain any number of terminals that enable electrical connections to external electrical circuits or components. Electrical inputs to one or more terminals on the board may be altered and output to one or more different terminals. Electrical inputs may also be routed between any number of terminals without being altered.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Couple" or "Coupled" generally refers to an indirect and/or direct connection between the identified elements, components, and/or objects. Often the manner of the coupling will be related specifically to the manner in which the two coupled elements interact.

"Electrical Port" generally refers to a physical interface on an electronic or electric system that allows for the connection of a power source to at least provide power to the device. Common electrical port types can include USB-C, micro-USB, and Lightning connectors. These electrical ports facilitate both the operation of the device while connected to a power source and, if applicable, the recharging of the battery of the device.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra-batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Housing" generally refers to a component that covers, protects, and/or supports another thing. A housing can have a unitary construction or be made of multiple components. The housing can be made from the same material or a combination of different materials. The housing can include a protective cover designed to contain and/or support one or more mechanical components. Some non-limiting examples of a housing include a case, enclosure, covering, body, and shell.

"Inertial Measurement Unit" or "IMU" generally refers to a device that measures and reports a body's specific force, angular rate, and sometimes the magnetic field surrounding the body. The IMU typically, but not always, includes one or more accelerometers and gyroscopes, and sometimes magnetometers when the surrounding magnetic fields are measured. IMUs are typically (but not always) self-contained systems that measure linear and angular motion usually with a triad of gyroscopes and triad of accelerometers. An IMU can either be gimballed or strapdown, outputting the integrating quantities of angular velocity and acceleration in the sensor/body frame. They are commonly referred to in literature as the rate-integrating gyroscopes and accelerometers. IMUs typically can be used in a wide variety of circumstances such as to maneuver vehicles, aircraft, and/or spacecraft as well as in cellphones and virtual reality glasses. The accelerometers in IMUs can include mechanical and/or electronic type accelerometers, and the gyroscopes in IMUs can include mechanical and/or electronic type gyroscopes.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Integrally Formed" generally refers to a component and/or multiple components that are fused into a single piece. Integrally formed components are incapable of being dismantled without destroying the integrity of the component.

"Integrated Circuit (IC)" or "Microchip" generally refers to one or more electronic circuits integrated into a relatively small board and/or piece of semiconductor material. The IC typically incorporates many electronic components, such as transistors, diodes, resistors, and/or capacitors, into a packaging that is on a similar scale to some discrete electronic components. ICs can be designed for a variety of purposes, such as performing logical operations, storing data, and/or processing signals as some examples. The complexity of ICs can vary greatly. On the simple end, ICs are generally configured to perform a single task and/or have a relatively small number of components, such as below 100,000 or below 1 million transistors. Some examples of simple ICs include logic gates, operational amplifiers, comparators, timers, clocks, switches, multiplexers, encoders, simple memory chips, counters, shift registers, voltage regulators, Analog-to-Digital Converters (ADCs), and Digital-to-Analog Converters (DACs) to name a few. On the complex end, ICs are generally capable of performing a wide range of tasks, are programmable, and/or contain a large number of components, such as millions or even billions of transistors. Some examples of complex ICs include Central Processing Units (CPUs), Graphics Processing Units (GPUs), Systems on Chips (SoCs), Field-Programmable Gate Arrays (FPGAs), and/or other types of processors. In some examples, complex ICs include multiple simple ICs.

"Laser" generally refers to any device or system that generates and emits electromagnetic radiation through the process of stimulated emission, resulting in a coherent, collimated, and often monochromatic beam of energy. The word "laser" is an acronym for "Light Amplification by Stimulated Emission of Radiation." A laser can include devices that produce electromagnetic radiation across a broad range of frequencies, including but not limited to ultraviolet, visible, infrared, microwave, and radio frequencies. This encompasses traditional optical lasers, such as diode lasers, solid-state lasers, and gas lasers (for example, carbon dioxide lasers emitting in the infrared spectrum), as well as devices that generate coherent radiation at microwave frequencies, commonly known as masers ("Microwave Amplification by Stimulated Emission of Radiation"). Some nonlimiting examples of lasers include carbon dioxide lasers, diode lasers, fiber lasers, Nd: YAG lasers, excimer lasers, ultraviolet lasers, visible light lasers, infrared lasers, and masers, to name just a few.

"Lateral" generally refers to being situated on, directed toward, or coming from the side.

"Light Emitting Diode" or "LED" generally refers to a semiconductor diode, made from certain materials, in which light is emitted in response to application of an electrical current. A variety of materials in the LED can produce a range of colors. The color of the light (corresponding to the energy of the photons) is determined by the energy required for electrons to cross the band gap of the semiconductor. Typically, but not always, white light is obtained by using multiple semiconductors or a layer of light-emitting phosphor on the semiconductor device. The LED can come in the form of a variety of colors, shapes, sizes and designs, including with or without heat sinking, lenses, or reflectors, built into the package.

"Light" generally refers to electromagnetic radiation having any wavelength. Among other examples, light includes visible light, infrared, ultraviolet, gamma rays, X-rays, microwaves, and radio waves.

"Light Guide" generally refers to a transparent or translucent material that transmits light from one location to another. Some examples of light guides include optical fibers, fiber optic cables, and light pipes. A light guide in one form is an electromagnetic waveguide having an elongate conduit that includes a substantially transparent medium through which electromagnetic energy travels as the electromagnetic energy traverses the long axis of the conduit. Electromagnetic radiation may be maintained within the conduit by total internal reflection of the electromagnetic radiation as the radiation traverses the conduit. Total internal reflection is generally achieved using light guides that include a substantially transparent core surrounded by a second substantially transparent cladding material with a lower index of refraction than the core. Light guides are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through light guides include electromagnetic waves in the near-infrared, mid-infrared, and visible light portion of the electromagnetic spectrum, although electromagnetic energy of any suitable frequency may be used.

"Limb" generally refers to a jointed appendage of a human or animal body, primarily used for movement, support, and/or manipulation. Some examples of limbs include arms and legs in humans, or wings, fins, and legs in other animals.

"Longitudinal" generally refers to the length or lengthwise dimension of an object, rather than across.

"Magnet" generally refers to an object or device that produces a magnetic field. The magnetic field exerts a mechanical force on ferromagnetic materials and other magnetic dipoles. Permanent magnets maintain a constant magnetic field through the inherent alignment of electron spins within a crystalline lattice. Electromagnets generate magnetic fields via the flow of electric current through a conductive coil. Common examples of permanent magnets include neodymium iron boron and samarium cobalt alloys for high remanence applications. Ferrite magnets provide cost-effective solutions for low-intensity flux requirements. Solenoids represent a common type of electromagnet used in mechanical actuators. Superconducting magnets utilize cryogenic temperatures to eliminate electrical resistance and produce high-density magnetic flux. Soft iron cores function as temporary magnets within alternating current transformers.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Microphone" generally refers to a transducer that converts sound into an electrical signal.

"Original Equipment Manufacturer" or "OEM" generally refers to an organization that makes finished devices from component parts bought from other organizations that are usually sold under their own brand in a consumer or commercial market.

"Parallel" generally refers to coplanar straight lines in two-dimensional space or planes in the same three-dimensional space that never intersect and/or otherwise never meet.

"Plastic" generally refers to a synthetic or semi-synthetic material made from a wide range of organic polymers, such as polyethylene, PVC, nylon, and the like. Typically, but not always, plastics are mostly thermoplastic or thermosetting polymers of high molecular weight and that can be made into objects, films, or filaments. In some cases, plastics can be molded into shape while soft and then set into a rigid or slightly elastic form.

"Plug" generally refers to device that electrically connects a wire, cord, and/or cable to and inserts into a socket and/or jack. In other words, a plug is typically a male connector that interfaces with a female connector to make an electrical connection. Plugs generally include one or more electrical contacts, such as electrically conductive pads, pins, leaves, and/or plates as examples. In some cases, the contacts in a plug are recessed within the plug, and contacts from a socket insert into the plug when plugging into the socket. Plugs often, but not always, come in a standardized shape, such as USB-A, USB-B, USB-C, HDMI, VGA, 3.5 mm audio, Ethernet, landline telephone, and/or various standardized power plugs to name a few. Similarly, the contacts in a plug are generally arranged according to a standardized pinout. For example, Ethernet cables typically include a Registered Jack (RJ) 45 plug to support network connections between computers, modems, routers, network switches, and/or other network devices. As another example, telephone cables generally include an RJ11, RJ14, and/or RJ25 plug to connect telephones and/or telephone network devices. Standardized plug shapes and pinouts generally match those of the standard sockets to ensure proper connection between the contacts in the plug and the socket. Further, the plug typically mechanically connects to the socket when the plug is inserted, such as through a clip, tab, and/or another mechanism. In some cases, the plug includes a latch tab and/or a keying mechanism to ensure a plug can only be inserted in one orientation.

"Processor" generally refers to one or more electronic components configured to operate as a single unit configured or programmed to process input to generate an output.

Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Radially Outward" generally refers to a relative position that is positioned at a greater distance from a defined center point or axis. An object may be extending radially outward if the object has a starting point at a given distance from the defined center or axis and then moves farther away from that center point or axis.

"Resistor" generally refers to a passive electrical component that implements electrical resistance as a circuit element. For example, resistors can be used to reduce current flow, adjust signal levels, divide voltages, bias active elements, and/or terminate transmission lines, to name just a few use cases. Resistors can be in the form of fixed resistors or variable resistors.

"Satellite Navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation. Some of examples of satellite navigation systems include global positioning systems such as GPS and GLONASS as well as global positioning systems under development such as Galileo. A satellite navigation system may also be a regional positioning system such as BeiDou, NAVIC, and QZSS.

"Short-Range Communication" generally refers to any network that is capable of transmitting data over short distances using high-frequency electromagnetic radiation. Some examples of short-range communication protocols include, but are not limited to Bluetooth®. Wi-Fi, RFID, ZigBee®, and Thread® protocol standards.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Wireless Power Transfer" (WPT) or "Wireless Energy Transmission" (WET) generally refers to the transmission of electrical energy without wires as a physical link. In a WPT system, a power transmitter, driven by electric power from a power source, generates a time-varying electromagnetic field, which transmits power across space to a power receiver, which extracts power from the field and supplies the power to an electrical load. WPT is typically useful to power electrical devices where interconnecting wires are inconvenient, hazardous, and/or are not possible. For example, WPT can be used to charge portable electrical loads, like smartphones and vehicles. WPT techniques mainly fall into two general categories, non-radiative and radiative techniques. In near field or non-radiative techniques, power is transferred over short distances by magnetic fields using inductive coupling between coils of wire, or by electric fields using capacitive coupling between metal electrodes. Inductive charging can be for example used to charge handheld devices like phones and electric toothbrushes, RFID tags, and wirelessly charging implantable medical devices like artificial cardiac pacemakers, or electric vehicles. In far-field or radiative techniques, also called power beaming, power is transferred by beams of electromagnetic radiation, like microwaves and/or laser beams. These far-field techniques can transport energy longer distances, but the beam generally should be aimed at or near the power receiver. By way of nonlimiting examples, solar power satellites and wireless powered drone aircraft can be powered via these far-field WPT techniques.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 illumination device
105 user
110 appendage
115 limb
120 arm
125 wrist
130 hand
135 distal end
140 arrow
145 longitudinal axis
205 band
210 light sources

215 links
220 electrical port
225 proximal edge
230 distal edge
305 controller
310 ESS
315 power management circuit
320 microphone
325 button
330 accelerometer
335 GPS
405 housing
410 first board
415 second board
505 light control circuit
705 voltage regulator
1000 wristband
1005 adhesive
1010 security cuts
1100 illumination device
1105 flexible band
1110 slot
1115 hole
1120 stud
1125 band segment
1305 support plate
1310 wristband
1315 button cap
1400 illumination device
1405 slap bracelet
1410 band segment
1415 integral link
1600 illumination device
1605 housing
1610 flexible band
1615 first cover
1620 second cover
1625 band segment
1630 radial opening
1635 selection switch
2405 magnet
2410 main board
2415 band board
2420 support plate
2425 membrane
2430 electrical port cover
2435 switch cap
2440 cover
2705 channel
2900 illumination device
2905 wireless power transfer system
2910 power transmitter
2915 power receiver

What is claimed is:

1. A system, comprising:
an illumination device configured to be worn on an appendage;
wherein the illumination device includes one or more light sources;
wherein the illumination device is configured to shine light parallel to a longitudinal axis of the appendage;
wherein the illumination device includes a housing and a flexible band;
wherein the flexible band includes a support plate and multiple band segments;
wherein the support plate is disposed within the housing and the multiple band segments extending from the support plate;
wherein the multiple band segments have a proximal edge and a distal edge located opposite to the proximal edge;
a main board and a flexible printed circuit board (PCB);
wherein the main board is disposed on the support plate within the housing;
wherein the flexible PCB is embedded inside th distal edge of the multiple bang segments and on the support plate;
wherein the one or more light sources are mounted on the flexible PCB;
wherein the multiple band segments define one or more slots where the one or more light sources are received therein:
wherein the one or more slots are open along the distal edge to shine the light from the one or more light sources from the distal edge; and
wherein the one or more light sources are recessed inside the band to not extend to the proximal edge from the distal edge of the band.

2. The system of claim 1, wherein:
the appendage includes a wrist; and
the illumination device is configured to be worn on the wrist.

3. The system of claim 1, wherein:
the band includes a strap; and
the strap is configured to self-adhere to form a loop.

4. The system of claim 3, wherein the strap has one or more security cuts.

5. The system of claim 1, wherein the one or more light sources include light emitting diodes (LEDs).

6. The system of claim 1, wherein the one or more light sources are configured to shine multiple colors of light.

7. The system of claim 1, wherein the illumination device includes a satellite navigation system.

8. The system of claim 1, wherein the illumination device includes an Inertial Measurement Unit (IMU).

9. The system of claim 8, wherein the IMU includes an accelerometer.

10. The system of claim 8, further comprising:
a controller configured to cause operational change in the one or more light sources based on a reading from the IMU.

11. The system of claim 10, wherein the operational change includes flashing the one or more light sources.

12. The system of claim 10, wherein the operational change includes changing color of the one or more light sources.

13. The system of claim 10, wherein:
the appendage includes a wrist; and
the reading includes movement indicative of a flick of the wrist.

14. The system of claim 10, wherein the reading includes movement indicative of bands being hit together.

15. The system of claim 1, wherein:
the illumination device includes an Energy Storage System (ESS);
the ESS includes a battery; and
the illumination device includes a wireless charging device to charge the battery.

16. The system of claim 1, wherein:
the illumination device includes a controller;
the illumination device includes a microphone; and the controller is configured to cause operational change in the one or more light sources based on sound sensed by the microphone.

17. The system of claim 16, wherein the one or more light sources are configured to synchronize to music at an event.

18. The system of claim 1, further comprising:

a controller configured to coordinate operation of the one or more light sources with a lighting display at an event when at the event.

* * * * *